United States Patent
Tischer et al.

(10) Patent No.: US 8,543,098 B2
(45) Date of Patent: Sep. 24, 2013

(54) APPARATUS AND METHOD FOR SECURELY PROVIDING COMMUNICATIONS BETWEEN DEVICES AND NETWORKS

(75) Inventors: Steven Tischer, Atlanta, GA (US); Samuel N. Zellner, Dunwoody, GA (US); Robert J. Starr, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 12 days.

(21) Appl. No.: 12/639,448

(22) Filed: Dec. 16, 2009
(Under 37 CFR 1.47)

(65) Prior Publication Data
US 2010/0159880 A1    Jun. 24, 2010

Related U.S. Application Data

(63) Continuation of application No. 11/323,181, filed on Dec. 30, 2005, now abandoned, which is a continuation-in-part of application No. 10/195,197, filed on Jul. 15, 2002, now Pat. No. 7,194,083.

(51) Int. Cl.
*H04M 3/42* (2006.01)
*H04M 1/66* (2006.01)
*H04B 1/38* (2006.01)

(52) U.S. Cl.
USPC ......... 455/414.4; 455/410; 455/411; 455/558

(58) Field of Classification Search
USPC ................ 455/414.1, 414.4, 426.1, 558, 410, 455/411
See application file for complete search history.

(56) References Cited

U.S. PATENT DOCUMENTS

| | | | |
|---|---|---|---|
| 3,729,594 | A | 4/1973 | Krock et al. |
| 3,906,166 | A | 9/1975 | Cooper et al. |
| 3,956,596 | A | 5/1976 | Connolly et al. |
| 4,218,590 | A | 8/1980 | Rasmussen et al. |

(Continued)

FOREIGN PATENT DOCUMENTS

| | | |
|---|---|---|
| EP | 0 342 707 | 11/1989 |
| GB | 2 253 119 | 8/1992 |

(Continued)

OTHER PUBLICATIONS

US 6,876,861, Apr. 2005, Frank et al. (withdrawn).

(Continued)

*Primary Examiner* — Christopher M Brandt
*Assistant Examiner* — Muthuswamy Manoharan
(74) *Attorney, Agent, or Firm* — Hartman & Citrin LLC

(57) ABSTRACT

An apparatus, method, and computer-readable medium for securely providing communications between devices and networks are provided. According to one aspect of the invention, an interface device for providing communications between a first communications network and a device associated with a second communications network comprises an input, an output, logic, and a security program to restrict access to the input or the output of the interface device, connected devices or associated communication networks. The one or more inputs of the interface device receive data in a first format from the first communications network. The logic translates the data to a second format compatible with the second communications device. The translated data is then transmitted to the device associated with the second communications network via the one or more outputs. The security program determines whether a device or user is authorized to receive data prior to granting access to the data.

18 Claims, 21 Drawing Sheets

(56) References Cited

U.S. PATENT DOCUMENTS

| | | |
|---|---|---|
| 4,268,722 A | 5/1981 | Little et al. |
| 4,390,963 A | 6/1983 | Puhl et al. |
| 4,398,265 A | 8/1983 | Puhl et al. |
| 4,421,952 A | 12/1983 | Barnes |
| 4,434,461 A | 2/1984 | Puhl |
| 4,485,486 A | 11/1984 | Webb et al. |
| 4,486,624 A | 12/1984 | Puhl et al. |
| 4,528,424 A | 7/1985 | Middleton et al. |
| 4,549,311 A | 10/1985 | McLaughlin |
| 4,575,582 A | 3/1986 | Makino |
| 4,654,655 A | 3/1987 | Kowalski |
| 4,658,096 A | 4/1987 | West, Jr. et al. |
| 4,691,338 A | 9/1987 | Makino |
| 4,706,274 A | 11/1987 | Baker et al. |
| 4,734,928 A | 3/1988 | Weiner et al. |
| 4,737,975 A | 4/1988 | Shafer |
| 4,737,978 A | 4/1988 | Burke et al. |
| 4,741,018 A | 4/1988 | Potratz et al. |
| 4,748,655 A | 5/1988 | Thrower et al. |
| 4,751,725 A | 6/1988 | Bonata et al. |
| 4,775,997 A | 10/1988 | West, Jr. et al. |
| 4,775,998 A | 10/1988 | Felix et al. |
| 4,775,999 A | 10/1988 | Williams |
| 4,799,253 A | 1/1989 | Stern et al. |
| 4,843,621 A | 6/1989 | Potratz |
| 4,853,951 A | 8/1989 | Bauer |
| 4,866,762 A | 9/1989 | Pintar |
| 4,868,519 A | 9/1989 | Shafer |
| 4,890,315 A | 12/1989 | Bendixen et al. |
| 4,893,327 A | 1/1990 | Stern et al. |
| 4,922,486 A | 5/1990 | Lidinsky et al. |
| 4,922,517 A | 5/1990 | West, Jr. et al. |
| 5,020,091 A | 5/1991 | Krolopp et al. |
| 5,020,094 A | 5/1991 | Rash et al. |
| 5,046,085 A | 9/1991 | Godsey et al. |
| 5,117,450 A | 5/1992 | Joglekar et al. |
| 5,134,651 A | 7/1992 | Ortiz et al. |
| 5,185,779 A | 2/1993 | Dop et al. |
| 5,222,123 A | 6/1993 | Brown et al. |
| D339,809 S | 9/1993 | Ron |
| 5,257,406 A | 10/1993 | Ito et al. |
| 5,261,121 A | 11/1993 | Hashimoto |
| 5,287,322 A | 2/1994 | Rastegar |
| 5,311,477 A | 5/1994 | Rastegar |
| 5,323,418 A | 6/1994 | Ayerst et al. |
| 5,329,578 A | 7/1994 | Brennan et al. |
| 5,361,297 A | 11/1994 | Ortiz et al. |
| 5,367,558 A | 11/1994 | Gillig et al. |
| 5,375,258 A | 12/1994 | Gillig |
| D354,749 S | 1/1995 | Phillips |
| 5,406,588 A | 4/1995 | Birchler et al. |
| 5,426,689 A | 6/1995 | Griffith et al. |
| 5,430,719 A | 7/1995 | Weisser, Jr. |
| 5,430,761 A | 7/1995 | Bruckert et al. |
| 5,442,680 A | 8/1995 | Schellinger et al. |
| 5,444,433 A | 8/1995 | Gropper |
| 5,444,765 A | 8/1995 | Marui et al. |
| D362,003 S | 9/1995 | Claudio |
| 5,469,465 A | 11/1995 | Birchler et al. |
| 5,469,494 A | 11/1995 | Ortiz Perez et al. |
| 5,471,670 A | 11/1995 | Hess et al. |
| 5,475,734 A | 12/1995 | McDonald et al. |
| 5,475,735 A | 12/1995 | Williams et al. |
| 5,479,480 A | 12/1995 | Scott |
| 5,497,412 A | 3/1996 | Lannen et al. |
| 5,506,887 A | 4/1996 | Emery |
| 5,524,061 A | 6/1996 | Mooney et al. |
| 5,524,137 A | 6/1996 | Rhee |
| 5,528,666 A | 6/1996 | Weigand et al. |
| 5,530,736 A | 6/1996 | Comer et al. |
| 5,533,099 A | 7/1996 | Byrne |
| 5,544,227 A | 8/1996 | Blust et al. |
| 5,546,444 A | 8/1996 | Roach, Jr. et al. |
| 5,548,814 A | 8/1996 | Lorang et al. |
| 5,564,072 A | 10/1996 | Garcia Aguilera et al. |
| 5,574,984 A | 11/1996 | Reed et al. |
| 5,588,041 A | 12/1996 | Meyer, Jr. et al. |
| 5,594,782 A | 1/1997 | Zicker et al. |
| 5,596,625 A | 1/1997 | LeBlanc |
| 5,598,412 A | 1/1997 | Griffith et al. |
| 5,608,655 A | 3/1997 | Moughanni et al. |
| 5,610,910 A | 3/1997 | Focsaneanu et al. |
| 5,611,049 A | 3/1997 | Pitts |
| 5,613,213 A | 3/1997 | Naddell et al. |
| 5,629,976 A | 5/1997 | Loke et al. |
| 5,631,946 A | 5/1997 | Campana et al. |
| 5,659,698 A | 8/1997 | Weng et al. |
| 5,666,487 A | 9/1997 | Goodman et al. |
| 5,668,561 A | 9/1997 | Perrotta et al. |
| 5,673,304 A | 9/1997 | Connor et al. |
| 5,675,629 A | 10/1997 | Raffel et al. |
| 5,689,549 A | 11/1997 | Bertocci et al. |
| 5,689,803 A | 11/1997 | Tayloe |
| 5,703,933 A | 12/1997 | Ghisler |
| 5,706,328 A | 1/1998 | Williman |
| 5,708,659 A | 1/1998 | Rostoker et al. |
| 5,715,293 A | 2/1998 | Mahoney |
| 5,715,296 A | 2/1998 | Schornack et al. |
| 5,721,732 A | 2/1998 | Emeott et al. |
| 5,724,656 A | 3/1998 | Vo et al. |
| 5,742,905 A * | 4/1998 | Pepe et al. ............... 455/461 |
| 5,751,789 A | 5/1998 | Farris et al. |
| 5,757,902 A | 5/1998 | Mitsuo |
| 5,758,281 A | 5/1998 | Emery et al. |
| 5,764,730 A | 6/1998 | Rabe et al. |
| 5,771,453 A | 6/1998 | Haartsen |
| 5,771,459 A | 6/1998 | Demery et al. |
| 5,774,793 A | 6/1998 | Cooper et al. |
| 5,774,805 A | 6/1998 | Zicker |
| 5,774,857 A | 6/1998 | Newlin |
| 5,790,631 A | 8/1998 | Minarczik et al. |
| 5,798,694 A | 8/1998 | Reber et al. |
| 5,801,654 A | 9/1998 | Traylor |
| 5,802,481 A | 9/1998 | Prieto |
| 5,812,637 A | 9/1998 | Schornack et al. |
| 5,818,824 A | 10/1998 | Lu et al. |
| 5,826,034 A | 10/1998 | Albal |
| 5,826,193 A | 10/1998 | Ghisler et al. |
| 5,849,433 A | 12/1998 | Venugopal et al. |
| 5,859,894 A | 1/1999 | Ortiz Perez et al. |
| 5,875,395 A | 2/1999 | Holmes |
| 5,877,821 A | 3/1999 | Newlin et al. |
| 5,878,096 A | 3/1999 | Shao et al. |
| 5,884,193 A | 3/1999 | Kaplan |
| 5,898,679 A | 4/1999 | Brederveld et al. |
| 5,901,359 A | 5/1999 | Malmstrom |
| 5,903,832 A | 5/1999 | Seppanen et al. |
| 5,903,833 A | 5/1999 | Jonsson et al. |
| 5,905,950 A | 5/1999 | Anell |
| 5,911,120 A | 6/1999 | Jarett et al. |
| 5,917,434 A | 6/1999 | Murphy |
| 5,920,596 A | 7/1999 | Pan et al. |
| 5,920,815 A | 7/1999 | Akhavan |
| 5,926,760 A | 7/1999 | Khan et al. |
| 5,937,058 A | 8/1999 | Bleile et al. |
| 5,946,384 A | 8/1999 | Yee et al. |
| 5,946,616 A | 8/1999 | Schornack et al. |
| 5,949,616 A | 9/1999 | Coon et al. |
| 5,966,428 A | 10/1999 | Ortiz Perez et al. |
| 5,970,388 A | 10/1999 | Will |
| 5,978,469 A | 11/1999 | Benson |
| 5,982,762 A | 11/1999 | Anzai et al. |
| 5,982,854 A | 11/1999 | Ehreth |
| 5,983,117 A | 11/1999 | Sandler et al. |
| 5,987,100 A | 11/1999 | Fortman et al. |
| 5,987,678 A | 11/1999 | Ayers |
| 5,995,839 A | 11/1999 | Coursey |
| 6,002,937 A | 12/1999 | Young et al. |
| 6,009,086 A | 12/1999 | Freeburg et al. |
| 6,014,569 A | 1/2000 | Bottum |
| 6,016,107 A | 1/2000 | Kampe et al. |
| 6,016,269 A | 1/2000 | Peterson et al. |
| 6,018,665 A | 1/2000 | Chavez et al. |
| 6,026,086 A | 2/2000 | Lancelot et al. |

| | | | | | | |
|---|---|---|---|---|---|---|
| 6,028,984 A | 2/2000 | Kimball | | 6,470,028 B1 | 10/2002 | Perry et al. |
| 6,029,072 A | 2/2000 | Barber | | 6,470,187 B1 | 10/2002 | Rosen et al. |
| 6,031,492 A | 2/2000 | Griffin et al. | | 6,477,362 B1 | 11/2002 | Raith et al. |
| 6,035,215 A | 3/2000 | Goni et al. | | 6,480,714 B1 | 11/2002 | DePani et al. |
| 6,035,220 A | 3/2000 | Claudio et al. | | 6,496,693 B1 | 12/2002 | Tran |
| 6,038,265 A | 3/2000 | Pan et al. | | 6,507,589 B1 | 1/2003 | Ramasubramani et al. |
| 6,044,148 A | 3/2000 | Bleile | | 6,515,967 B1 | 2/2003 | Wei et al. |
| 6,058,106 A | 5/2000 | Cudak et al. | | 6,526,581 B1 | 2/2003 | Edson |
| 6,061,439 A | 5/2000 | Bleile et al. | | 6,529,707 B1 | 3/2003 | Dent |
| 6,072,828 A | 6/2000 | Chun | | 6,529,746 B1 | 3/2003 | Kotzin |
| 6,072,858 A | 6/2000 | Bellin | | 6,542,497 B1 | 4/2003 | Curry et al. |
| 6,072,862 A | 6/2000 | Srinivasan | | 6,573,938 B1 | 6/2003 | Schulz et al. |
| 6,072,869 A | 6/2000 | Becker et al. | | 6,577,952 B2 | 6/2003 | Geier et al. |
| 6,073,031 A | 6/2000 | Helstab et al. | | 6,600,734 B1 | 7/2003 | Gernert et al. |
| 6,075,783 A | 6/2000 | Voit | | 6,615,056 B1 | 9/2003 | Taylor et al. |
| 6,078,805 A | 6/2000 | Scott | | 6,631,120 B1 | 10/2003 | Milbrandt |
| 6,080,690 A | 6/2000 | Lebby et al. | | 6,639,917 B1 | 10/2003 | Ellington et al. |
| 6,114,053 A | 9/2000 | Matsuyama et al. | | 6,643,709 B1 | 11/2003 | Kwon |
| 6,115,388 A | 9/2000 | Chinitz et al. | | 6,690,923 B1 | 2/2004 | Ortiz Perez et al. |
| 6,115,604 A | 9/2000 | Lester et al. | | 6,701,352 B1 | 3/2004 | Gardener et al. |
| 6,116,014 A | 9/2000 | Dalla Betta et al. | | 6,704,317 B1 | 3/2004 | Dobson |
| 6,121,881 A | 9/2000 | Bieback et al. | | 6,704,580 B1 | 3/2004 | Fintel |
| 6,122,515 A | 9/2000 | Ito et al. | | 6,707,888 B1 | 3/2004 | Cope |
| 6,122,531 A | 9/2000 | Nicholls et al. | | 6,714,797 B1 | 3/2004 | Rautila |
| 6,125,126 A | 9/2000 | Hallenstang | | D490,063 S | 5/2004 | Miller |
| 6,134,235 A | 10/2000 | Goldman et al. | | D490,066 S | 5/2004 | Lytel |
| 6,134,314 A | 10/2000 | Dougherty et al. | | D490,067 S | 5/2004 | Haney |
| 6,137,466 A | 10/2000 | Moughanni et al. | | 6,741,835 B2 | 5/2004 | Pulver |
| 6,138,026 A | 10/2000 | Irvin | | D490,794 S | 6/2004 | Rathmell |
| 6,141,341 A | 10/2000 | Jones et al. | | D491,159 S | 6/2004 | Lytel |
| 6,145,084 A | 11/2000 | Zuili et al. | | 6,757,528 B1 | 6/2004 | Cardina et al. |
| 6,148,069 A | 11/2000 | Ekstrom et al. | | 6,775,522 B2 | 8/2004 | Schornack et al. |
| 6,151,500 A | 11/2000 | Cardina et al. | | 6,775,552 B2 | 8/2004 | Link, II |
| 6,151,620 A | 11/2000 | Madsen et al. | | 6,778,824 B2 | 8/2004 | Wonak et al. |
| 6,157,545 A | 12/2000 | Janninck et al. | | 6,781,481 B2 | 8/2004 | Richardson |
| 6,167,271 A | 12/2000 | Parker et al. | | 6,782,003 B1 | 8/2004 | Giroux et al. |
| 6,167,278 A | 12/2000 | Nilssen | | 6,785,517 B2 | 8/2004 | Schornack et al. |
| 6,169,988 B1 * | 1/2001 | Asakura ............................. 707/10 | | 6,788,953 B1 | 9/2004 | Cheah et al. |
| 6,188,888 B1 | 2/2001 | Bartle et al. | | 6,792,095 B1 | 9/2004 | Frank |
| 6,192,231 B1 | 2/2001 | Chapman et al. | | 6,801,159 B2 | 10/2004 | Swope et al. |
| 6,198,947 B1 | 3/2001 | Barber | | 6,801,793 B1 | 10/2004 | Aarnio et al. |
| 6,203,192 B1 | 3/2001 | Fortman | | 6,801,934 B1 | 10/2004 | Eranko |
| 6,208,827 B1 | 3/2001 | Menon et al. | | 6,825,762 B2 | 11/2004 | Giacopelli et al. |
| 6,212,396 B1 | 4/2001 | Brown et al. | | 6,829,501 B2 | 12/2004 | Nielsen et al. |
| 6,212,550 B1 | 4/2001 | Segur | | 6,832,082 B1 | 12/2004 | Ramasawamy et al. |
| 6,222,919 B1 | 4/2001 | Hollatz et al. | | 6,832,093 B1 | 12/2004 | Ranta |
| 6,230,031 B1 | 5/2001 | Barber | | 6,865,384 B2 | 3/2005 | Sagi et al. |
| 6,240,277 B1 | 5/2001 | Bright | | 6,900,772 B2 | 5/2005 | Pulver |
| 6,252,867 B1 | 6/2001 | Pfeil et al. | | 6,920,144 B2 | 7/2005 | Niermann |
| 6,253,088 B1 | 6/2001 | Wenk | | 6,920,313 B2 | 7/2005 | Trombatore |
| 6,256,489 B1 | 7/2001 | Lichter et al. | | 6,922,170 B2 | 7/2005 | Alexander, Jr. |
| 6,259,925 B1 | 7/2001 | Josse | | 6,922,432 B2 | 7/2005 | Callaway, Jr. et al. |
| 6,272,134 B1 | 8/2001 | Bass et al. | | 6,940,820 B2 | 9/2005 | Fang |
| 6,282,564 B1 | 8/2001 | Smith et al. | | 6,947,738 B2 | 9/2005 | Skog et al. |
| 6,295,348 B1 | 9/2001 | Bleile et al. | | 6,950,674 B2 | 9/2005 | Jarrett |
| 6,297,646 B1 | 10/2001 | Lang et al. | | 6,961,330 B1 | 11/2005 | Cattan et al. |
| 6,301,474 B1 | 10/2001 | Hartmaier et al. | | 6,961,575 B2 | 11/2005 | Stanforth |
| 6,314,299 B1 | 11/2001 | Schreib et al. | | 6,978,141 B2 | 12/2005 | Smith et al. |
| 6,317,064 B1 | 11/2001 | Ferrer et al. | | 6,978,154 B1 | 12/2005 | Ospalak et al. |
| 6,324,410 B1 | 11/2001 | Giacopelli et al. | | 6,981,045 B1 | 12/2005 | Brooks |
| 6,330,247 B1 | 12/2001 | Chang et al. | | 6,996,396 B1 | 2/2006 | Snapp |
| 6,331,972 B1 | 12/2001 | Harris et al. | | 7,003,287 B2 | 2/2006 | Roeder |
| 6,333,919 B2 | 12/2001 | Gaffney | | 7,032,115 B2 | 4/2006 | Kashani |
| 6,339,795 B1 | 1/2002 | Narurkar et al. | | 7,035,633 B2 | 4/2006 | Kirkpatrick |
| 6,362,778 B2 | 3/2002 | Neher | | 7,073,129 B1 | 7/2006 | Robarts et al. |
| 6,396,413 B2 | 5/2002 | Hines et al. | | 7,085,566 B1 | 8/2006 | Burchard |
| 6,396,457 B1 | 5/2002 | Gatherer et al. | | 7,096,491 B2 * | 8/2006 | Cheng ............................. 726/4 |
| 6,405,027 B1 | 6/2002 | Bell | | 7,097,851 B1 | 8/2006 | Takada |
| 6,411,802 B1 | 6/2002 | Cardina et al. | | 7,099,825 B1 | 8/2006 | Cook |
| 6,429,811 B1 | 8/2002 | Zhao et al. | | 7,120,426 B2 | 10/2006 | Link, II et al. |
| 6,434,394 B1 | 8/2002 | Grundvig et al. | | 7,120,454 B1 | 10/2006 | Frank et al. |
| 6,438,215 B1 | 8/2002 | Skladman et al. | | 7,130,609 B2 | 10/2006 | Cardina et al. |
| 6,442,241 B1 | 8/2002 | Tsumpes | | 7,130,616 B2 | 10/2006 | Janik |
| 6,449,269 B1 | 9/2002 | Edholm | | 7,133,795 B1 | 11/2006 | Iaciofano et al. |
| 6,453,154 B1 | 9/2002 | Haber et al. | | 7,136,358 B2 | 11/2006 | Kunito et al. |
| 6,459,688 B1 | 10/2002 | Bursztejn et al. | | 7,149,514 B1 | 12/2006 | DePani et al. |
| 6,459,776 B1 | 10/2002 | Aktas et al. | | 7,184,768 B2 | 2/2007 | Hind et al. |
| 6,466,783 B2 | 10/2002 | Dahm et al. | | 7,194,083 B1 | 3/2007 | Tischer et al. |
| 6,466,799 B1 | 10/2002 | Torrey et al. | | 7,196,625 B1 | 3/2007 | Nguyen |

| | | |
|---|---|---|
| 7,200,424 B2 | 4/2007 | Tischer et al. |
| 7,203,199 B1 | 4/2007 | Duree et al. |
| 7,212,111 B2 | 5/2007 | Tupler et al. |
| 7,218,895 B1 | 5/2007 | Raghavan |
| 7,221,950 B2 | 5/2007 | Frank et al. |
| 7,231,481 B2 | 6/2007 | Scott et al. |
| 7,248,590 B1 | 7/2007 | Liu |
| 7,272,153 B2 | 9/2007 | Cline |
| 7,274,926 B1 * | 9/2007 | Laumen et al. ............ 455/414.1 |
| 7,274,927 B2 * | 9/2007 | Olrik ......................... 455/414.4 |
| 7,280,817 B2 | 10/2007 | Comp |
| 7,283,519 B2 | 10/2007 | Girard |
| 7,284,147 B2 | 10/2007 | Rao et al. |
| 7,289,616 B2 | 10/2007 | Punaganti et al. |
| 7,308,498 B1 | 12/2007 | Olsen et al. |
| 7,315,553 B2 | 1/2008 | Keller-Tuberg et al. |
| 7,318,099 B2 | 1/2008 | Stahl et al. |
| 7,363,034 B2 | 4/2008 | DePani et al. |
| 7,376,386 B2 | 5/2008 | Phillips et al. |
| 7,392,035 B2 | 6/2008 | Rahman et al. |
| 7,418,492 B1 | 8/2008 | Cohen et al. |
| 7,437,148 B1 | 10/2008 | Vaghi |
| 7,437,330 B1 | 10/2008 | Robinson et al. |
| 7,440,887 B2 | 10/2008 | Soulet |
| 7,460,510 B2 | 12/2008 | Olivier et al. |
| 7,467,103 B1 | 12/2008 | Murray et al. |
| 7,499,529 B1 | 3/2009 | Kvache et al. |
| 7,522,722 B2 | 4/2009 | Tischer et al. |
| 7,574,523 B2 | 8/2009 | Traversat et al. |
| 7,623,653 B2 | 11/2009 | Tischer et al. |
| 7,630,705 B2 | 12/2009 | Galicia et al. |
| 7,650,415 B1 | 1/2010 | Peterson |
| 8,046,007 B2 | 10/2011 | Frank et al. |
| 2001/0026537 A1 | 10/2001 | Massey |
| 2001/0035459 A1 | 11/2001 | Komai |
| 2001/0037404 A1 | 11/2001 | Hafsteinsson et al. |
| 2001/0040512 A1 | 11/2001 | Hines et al. |
| 2001/0041533 A1 | 11/2001 | Schornack et al. |
| 2001/0049264 A1 | 12/2001 | Balech |
| 2002/0006137 A1 | 1/2002 | Rabenko et al. |
| 2002/0016739 A1 | 2/2002 | Ogasawara |
| 2002/0021669 A1 | 2/2002 | Kunito et al. |
| 2002/0023010 A1 | 2/2002 | Rittmaster et al. |
| 2002/0025832 A1 | 2/2002 | Durian et al. |
| 2002/0027994 A1 * | 3/2002 | Katayama et al. ............ 380/269 |
| 2002/0039892 A1 | 4/2002 | Lindell |
| 2002/0044641 A1 | 4/2002 | Wanner |
| 2002/0045453 A1 | 4/2002 | Juttner et al. |
| 2002/0054667 A1 | 5/2002 | Martinez |
| 2002/0065109 A1 | 5/2002 | Mansikkaniemi et al. |
| 2002/0068544 A1 | 6/2002 | Barzilay et al. |
| 2002/0068558 A1 | 6/2002 | Janik |
| 2002/0073416 A1 | 6/2002 | Cantan |
| 2002/0086666 A1 | 7/2002 | Chen |
| 2002/0089998 A1 | 7/2002 | Le |
| 2002/0093948 A1 | 7/2002 | Dertz et al. |
| 2002/0094776 A1 | 7/2002 | Pulver |
| 2002/0098874 A1 | 7/2002 | Zirul et al. |
| 2002/0099663 A1 | 7/2002 | Yoshino et al. |
| 2002/0108121 A1 | 8/2002 | Alao et al. |
| 2002/0123359 A1 | 9/2002 | Wei et al. |
| 2002/0137498 A1 | 9/2002 | Goss et al. |
| 2002/0146977 A1 | 10/2002 | Schornack et al. |
| 2002/0151327 A1 | 10/2002 | Levitt |
| 2002/0156626 A1 | 10/2002 | Hutchison |
| 2002/0160748 A1 | 10/2002 | Rahman et al. |
| 2002/0184517 A1 * | 12/2002 | Tadayon et al. ................ 713/200 |
| 2003/0005135 A1 | 1/2003 | Inoue et al. |
| 2003/0006913 A1 | 1/2003 | Joyce et al. |
| 2003/0008680 A1 | 1/2003 | Huh et al. |
| 2003/0041000 A1 | 2/2003 | Zajac et al. |
| 2003/0050062 A1 | 3/2003 | Chen et al. |
| 2003/0060231 A1 | 3/2003 | Bozionek et al. |
| 2003/0063714 A1 | 4/2003 | Stumer et al. |
| 2003/0067314 A1 | 4/2003 | Kaukko |
| 2003/0074672 A1 | 4/2003 | Daniels |
| 2003/0076672 A1 | 4/2003 | Head |
| 2003/0078029 A1 | 4/2003 | Petite |
| 2003/0096600 A1 | 5/2003 | Lewis et al. |
| 2003/0108189 A1 | 6/2003 | Barzani |
| 2003/0125023 A1 | 7/2003 | Fishler |
| 2003/0128115 A1 | 7/2003 | Giacopelli et al. |
| 2003/0134661 A1 | 7/2003 | Rudd et al. |
| 2003/0137991 A1 | 7/2003 | Doshi et al. |
| 2003/0138050 A1 | 7/2003 | Yamada et al. |
| 2003/0142798 A1 | 7/2003 | Gavette et al. |
| 2003/0145228 A1 | 7/2003 | Suuronen et al. |
| 2003/0156660 A1 | 8/2003 | Zoltowski et al. |
| 2003/0171095 A1 | 9/2003 | Fujinami |
| 2003/0172121 A1 | 9/2003 | Evans et al. |
| 2003/0172218 A1 | 9/2003 | Scott et al. |
| 2003/0187920 A1 | 10/2003 | Redkar |
| 2003/0190018 A1 | 10/2003 | Bleile et al. |
| 2003/0208651 A1 | 11/2003 | Wurzburg |
| 2003/0214775 A1 | 11/2003 | Fukuta et al. |
| 2003/0216134 A1 | 11/2003 | Mutoh |
| 2003/0231594 A1 | 12/2003 | Xu et al. |
| 2003/0235219 A1 | 12/2003 | Kapadia et al. |
| 2003/0236091 A1 | 12/2003 | Wonak et al. |
| 2004/0024660 A1 | 2/2004 | Ganesh et al. |
| 2004/0045096 A1 | 3/2004 | Mani et al. |
| 2004/0067770 A1 | 4/2004 | King et al. |
| 2004/0095316 A1 | 5/2004 | Shibamiya et al. |
| 2004/0131040 A1 | 7/2004 | Gruhl et al. |
| 2004/0132438 A1 | 7/2004 | White |
| 2004/0160372 A1 | 8/2004 | Pulver |
| 2004/0165681 A1 | 8/2004 | Mohan |
| 2004/0174901 A1 | 9/2004 | Ghori et al. |
| 2004/0177310 A1 | 9/2004 | Mohan et al. |
| 2004/0178905 A1 | 9/2004 | Dernier et al. |
| 2004/0203639 A1 | 10/2004 | Ozer et al. |
| 2004/0203705 A1 | 10/2004 | Lundby |
| 2004/0203745 A1 | 10/2004 | Cooper |
| 2004/0203942 A1 | 10/2004 | Dehlin |
| 2004/0205650 A1 | 10/2004 | Cheng |
| 2004/0208119 A1 | 10/2004 | Christodoulou et al. |
| 2004/0214569 A1 | 10/2004 | Cardina et al. |
| 2004/0232770 A1 | 11/2004 | Gisy et al. |
| 2004/0236999 A1 | 11/2004 | Bezuidenhout |
| 2004/0240647 A1 | 12/2004 | Tiliks et al. |
| 2004/0252675 A1 | 12/2004 | Lund |
| 2004/0253945 A1 | 12/2004 | Janik |
| 2004/0266418 A1 | 12/2004 | Kotzin |
| 2004/0267535 A1 | 12/2004 | Kotzin |
| 2005/0002407 A1 | 1/2005 | Shaheen et al. |
| 2005/0021818 A1 | 1/2005 | Singhal et al. |
| 2005/0025299 A1 | 2/2005 | Tischer et al. |
| 2005/0025305 A1 | 2/2005 | Tischer et al. |
| 2005/0025308 A1 | 2/2005 | Tischer et al. |
| 2005/0032435 A1 | 2/2005 | Tischer et al. |
| 2005/0032549 A1 | 2/2005 | Kawaguchi |
| 2005/0037751 A1 | 2/2005 | Kim et al. |
| 2005/0043068 A1 | 2/2005 | Shohara et al. |
| 2005/0044229 A1 | 2/2005 | Brown et al. |
| 2005/0075093 A1 | 4/2005 | Lei et al. |
| 2005/0099959 A1 | 5/2005 | Standridge |
| 2005/0107109 A1 | 5/2005 | Gunaratnam et al. |
| 2005/0113045 A1 | 5/2005 | Santhoff et al. |
| 2005/0124319 A1 | 6/2005 | Williams et al. |
| 2005/0129224 A1 | 6/2005 | Picket et al. |
| 2005/0129225 A1 | 6/2005 | Picket et al. |
| 2005/0129226 A1 | 6/2005 | Picket et al. |
| 2005/0143016 A1 | 6/2005 | Becker et al. |
| 2005/0143017 A1 | 6/2005 | Lopp et al. |
| 2005/0143149 A1 | 6/2005 | Becker et al. |
| 2005/0143671 A1 | 6/2005 | Hastings et al. |
| 2005/0146431 A1 | 7/2005 | Hastings et al. |
| 2005/0147119 A1 | 7/2005 | Tofano |
| 2005/0148890 A1 | 7/2005 | Hastings |
| 2005/0151640 A1 | 7/2005 | Hastings |
| 2005/0180397 A1 | 8/2005 | Yeom |
| 2005/0191991 A1 | 9/2005 | Owen et al. |
| 2005/0193131 A1 | 9/2005 | Bai et al. |
| 2005/0195855 A1 | 9/2005 | Buskirk et al. |
| 2005/0200492 A1 | 9/2005 | Woodard et al. |
| 2005/0202825 A1 | 9/2005 | Puranik et al. |
| 2005/0232284 A1 | 10/2005 | Karaoguz et al. |
| 2005/0238146 A1 | 10/2005 | Poustchi et al. |

| | | | |
|---|---|---|---|
| 2005/0240467 A1 | 10/2005 | Eckart et al. | |
| 2005/0245241 A1 | 11/2005 | Durand et al. | |
| 2005/0261970 A1 | 11/2005 | Vucina et al. | |
| 2005/0271080 A1 | 12/2005 | Gorman | |
| 2005/0282536 A1 | 12/2005 | McClure et al. | |
| 2006/0059096 A1 | 3/2006 | Dublish et al. | |
| 2006/0064750 A1 | 3/2006 | Kersey et al. | |
| 2006/0078292 A1 | 4/2006 | Huang et al. | |
| 2006/0121916 A1 | 6/2006 | Aborn et al. | |
| 2006/0133414 A1 | 6/2006 | Luoma et al. | |
| 2006/0143266 A1 | 6/2006 | Ohto et al. | |
| 2006/0160571 A1 | 7/2006 | DePani et al. | |
| 2006/0167985 A1 | 7/2006 | Albanese et al. | |
| 2006/0187956 A1 | 8/2006 | Doviak et al. | |
| 2006/0195554 A1* | 8/2006 | Payne et al. | 709/219 |
| 2006/0209745 A1 | 9/2006 | MacMullan et al. | |
| 2006/0251115 A1 | 11/2006 | Haque et al. | |
| 2007/0014307 A1 | 1/2007 | Srinivasan et al. | |
| 2007/0017976 A1 | 1/2007 | Peyret et al. | |
| 2007/0054660 A1 | 3/2007 | Cardina et al. | |
| 2007/0088816 A1 | 4/2007 | Roberts et al. | |
| 2007/0094279 A1 | 4/2007 | Mittal et al. | |
| 2007/0121651 A1 | 5/2007 | Casey et al. | |
| 2007/0127644 A1 | 6/2007 | Tischer et al. | |
| 2007/0178900 A1 | 8/2007 | Frank et al. | |
| 2007/0206592 A1 | 9/2007 | Itakura et al. | |
| 2007/0268922 A1 | 11/2007 | Dougan et al. | |
| 2007/0291921 A1 | 12/2007 | Fleischer et al. | |
| 2008/0020734 A1 | 1/2008 | Smith et al. | |
| 2008/0096528 A1 | 4/2008 | DePani et al. | |
| 2008/0192768 A1 | 8/2008 | Tischer et al. | |
| 2008/0228600 A1 | 9/2008 | Treyz et al. | |
| 2008/0301231 A1 | 12/2008 | Mehta et al. | |
| 2008/0317063 A1 | 12/2008 | Enzmann et al. | |
| 2011/0026436 A1 | 2/2011 | Karaoguz et al. | |
| 2012/0021738 A1 | 1/2012 | Frank et al. | |

FOREIGN PATENT DOCUMENTS

| | | |
|---|---|---|
| GB | 2 283 881 | 5/1995 |
| GB | 2 285 556 | 7/1995 |
| WO | WO 98/28929 | 7/1998 |
| WO | WO 01/58181 | 8/2001 |

OTHER PUBLICATIONS (Spec Sheet) AdvanceTec—AdvanceCommunicator®—Nokia Product Sheet; printed Jan. 2006, 1 page.
(Spec Sheet) AdvanceTec—OEM Services; AdvanceTec—The Company; printed Jan. 2006, 1 page.
(Spec Sheet) Bluetooth Enabled Technology; ELBT595; printed Jan. 2006, 1 page.
(Spec Sheet) Cell Antenna—Introducing Celldock; Mar. 16, 2005, 1 page.
(Spec Sheet) Merge by Cidco Communications—Merge for Motorola®; Design & Engineering Showcase Honors 2004; printed Jan. 2006, 2 pages.
(Spec Sheet) Motorola SD 4505 System Expansion Cellular Phone Docking Station; page last updated Apr. 12, 2005; 1 page.
(Spec Sheet) RCA 23200RE3—RCA Multi-Handset cell Docking System; Revised Jun. 6, 2005; 2 pages.
AdvanceTec, The AdvanceTec Solution, Cellular Hands-Free Solution: The Pro-Installed Hands Free, printed Jan. 2006, 4 pages.
CellAntenna Corporation: Cellular Antennas, accessories, cellphone products, www.cellantenna.com; CellAntenna Corporation; printed Sep. 26, 2002.
Cellsocket, Welcome to WHP Wireless, www.libretel.net/welcome.html; printed Aug. 17, 2005; 1 page.
CellSocket, www.cellantenna.com/Dockingstations/cellsocket.htm; Cell Antenna Corporation, printed Sep. 26, 2002.
Cellular Docking Station for Nokia Motorola Star Teac and Erickson Cellular Phones, www.cellantenna.com/Dockingstations/dockingstations.htm, CellAntenna Corporation, Sep. 26, 2002.
http://www.hometoys.com/news.php4?section=enchancedview&id=17792169; printed Aug. 17, 2005; 3 pages.
MercuryNews.com, Dock makes cell convenient at home, Jul. 25, 2005, www.timesleader.com/mld/timesleader/business/technology/12216277.htm, printed Aug. 17, 2005; 4 pages.
Motorola, SD4505—Cell phone dock module for SD4500 Series, printed Aug. 17, 2005, pp. 1-2.
PhoneLabs, PhoneLabs Products, printed Aug. 17, 2005, pp. 1-2.
RCA Communications, RCA Cell Docking System 23200RE3, printed Aug. 17, 2005, pp. 1-2.
RCA, Innovative RCA Cell Docking System Allows cell Users to Make and Receive Calls Through a Home Phone, printed Aug. 17, 2005, pp. 1-3.
Telular Corporation—2004 Annual Report, Making Wireline Replacement a Reality, 2004, 76 pages.
Thomson Group, Annual Report, Jun. 3, 2005, pp. 1-180.
Thomson Group, Index to Consolidated Financial Statement, Jun. 3, 2005, F1-F7, 150 pages total.
VOX2 Cellphone Base Station Model No. 131, Vox.Link User Guide, Rev. 1.02., printed Jan. 2006, 1 page.
VOX2 Voxlink Cellphone Docking Station, www.cellantenna.com/Dockingstations/VOX2dockingstation.htm; CellAntenna Corporation, printed Sep. 26, 2002.
U.S. Official Action dated Nov. 9, 2000 in U.S. Appl. No. 09/126,268.
U.S. Official Action dated Jul. 5, 2001 in U.S. Appl. No. 09/126,268.
U.S. Official Action dated Oct. 25, 2000 in U.S. Appl. No. 09/268,591.
U.S. Official Action dated May 1, 2001 in U.S. Appl. No. 09/268,591.
U.S. Official Action dated Jul. 7, 2004 in U.S. Appl. No. 09/999,806.
U.S. Official Action dated Nov. 30, 2005 in U.S. Appl. No. 09/999,806.
U.S. Official Action dated Sep. 23, 2004 in U.S. Appl. No. 10/195,197.
U.S. Official Action dated May 25, 2005 in U.S. Appl. No. 10/195,197.
U.S. Official Action dated Dec. 16, 2005 in U.S. Appl. No. 10/195,197.
U.S. Official Action dated Apr. 28, 2006 in U.S. Appl. No. 10/195,197.
U.S. Notice of Allowance / Allowability dated Jan. 4, 2007 in U.S. Appl. No. 10/195,197.
U.S. Official Action dated Jan. 28, 2004 in U.S. Appl. No. 10/036,206.
U.S. Official Action dated Jul. 19, 2004 in U.S. Appl. No. 10/036,206.
U.S. Official Action dated May 5, 2005 in U.S. Appl. No. 10/036,206.
U.S. Official Action dated Dec. 23, 2005 in U.S. Appl. No. 10/036,206.
U.S. Official Action dated Aug. 15, 2003 in U.S. Appl. No. 10/055,212.
U.S. Official Action dated Mar. 6, 2008 in U.S. Appl. No. 10/929,317.
U.S. Official Action dated Dec. 9, 2008 in U.S. Appl. No. 10/929,317.
U.S. Official Action dated Apr. 26, 2006 in U.S. Appl. No. 10/929,711.
U.S. Notice of Allowance / Allowability dated Oct. 30, 2006 in U.S. Appl. No. 10/929,711.
U.S. Official Action dated Mar. 6, 2008 in U.S. Appl. No. 10/929,712.
U.S. Notice of Allowance / Allowability dated Dec. 15, 2008 in U.S. Appl. No. 10/929,712.
U.S. Official Action dated Mar. 5, 2008 in U.S. Appl. No. 10/929,715.
U.S. Official Action dated Jun. 19, 2008 in U.S. Appl. No. 10/929,715.
U.S. Official Action dated Apr. 13, 2009 in U.S. Appl. No. 10/929,715.
U.S. Official Action dated Nov. 30, 2005 in U.S. Appl. No. 11/048,132.
U.S. Official Action dated Jun. 20, 2006 in U.S. Appl. No. 11/048,132.
U.S. Official Action dated Apr. 11, 2007 in U.S. Appl. No. 11/322,532.
U.S. Official Action dated Oct. 7, 2008 in U.S. Appl. No. 11/323,180.
U.S. Official Action dated May 12, 2009 in U.S. Appl. No. 11/323,180.
U.S. Official Action dated Jan. 16, 2009 in U.S. Appl. No. 11/323,182.
U.S. Official Action dated Jul. 20, 2009 in U.S. Appl. No. 11/323,182.
U.S. Official Action dated Oct. 30, 2008 in U.S. Appl. No. 11/323,185.

U.S. Official Action dated May 18, 2009 in U.S. Appl. No. 11/323,185.
U.S. Official Action dated Oct. 15, 2008 in U.S. Appl. No. 11/323,186.
U.S. Official Action dated May 12, 2009 in U.S. Appl. No. 11/323,186.
U.S. Official Action dated Jan. 21, 2009 in U.S. Appl. No. 11/323,818.
U.S. Official Action dated Mar. 14, 2008 in U.S. Appl. No. 11/323,820.
U.S. Official Action dated Nov. 17, 2008 in U.S. Appl. No. 11/323,820.
U.S. Official Action dated Apr. 22, 2009 in U.S. Appl. No. 11/323,820.
U.S. Official Action dated Apr. 1, 2008 in U.S. Appl. No. 11/323,825.
U.S. Official Action dated Sep. 16, 2008 in U.S. Appl. No. 11/323,825.
U.S. Official Action dated Mar. 5, 2009 in U.S. Appl. No. 11/323,825.
U.S. Official Action dated Jun. 23, 2009 in U.S. Appl. No. 11/323,825.
U.S. Official Action dated Mar. 17, 2008 in U.S. Appl. No. 11/324,033.
U.S. Official Action dated Dec. 23, 2008 in U.S. Appl. No. 11/324,033.
U.S. Official Action dated Jun. 2, 2009 in U.S. Appl. No. 11/324,033.
U.S. Official Action dated Mar. 28, 2008 in U.S. Appl. No. 11/324,034.
U.S. Official Action dated Oct. 3, 2008 in U.S. Appl. No. 11/324,034.
U.S. Official Action dated Apr. 14, 2009 in U.S. Appl. No. 11/324,034.
U.S. Official Action dated Feb. 5, 2009 in U.S. Appl. No. 11/324,149.
U.S. Official Action dated Jul. 22, 2009 in U.S. Appl. No. 11/324,149.
U.S. Official Action dated Mar. 11, 2008 in U.S. Appl. No. 11/324,154.
U.S. Official Action dated Dec. 30, 2008 in U.S. Appl. No. 11/324,154.
U.S. Official Action dated Jul. 9, 2009 in U.S. Appl. No. 11/324,154.
U.S. Official Action dated Jul. 6, 2007 in U.S. Appl. No. 11/637,264.
U.S. Official Action dated Apr. 8, 2008 in U.S. Appl. No. 11/637,264.
U.S. Official Action dated May 13, 2009 in U.S. Appl. No. 11/637,264.
U.S. Notice of Allowance / Allowability dated Jun. 21, 2002 in U.S. Appl. No. 09/126,268.
U.S. Notice of Allowance / Allowability dated Oct. 23, 2001 in U.S. Appl. No. 09/268,591.
U.S. Notice of Allowance / Allowability dated Mar. 23, 2005 in U.S. Appl. No. 09/999,806.
U.S. Notice of Allowance / Allowability dated Apr. 5, 2006 in U.S. Appl. No. 09/999,806.
U.S. Notice of Allowance / Allowability dated Aug. 7, 2006 in U.S. Appl. No. 09/999,806.
U.S. Notice of Allowance / Allowability dated Jan. 4, 2005 in U.S. Appl. No.. 10/036,206.
U.S. Notice of Allowance / Allowability dated Sep. 7, 2005 in U.S. Appl. No. 10/036,206.
U.S. Notice of Allowance / Allowability dated Apr. 6, 2006 in U.S. Appl. No. 10/036,206.
U.S. Notice of Allowance / Allowability dated Feb. 24, 2004 in U.S. Appl. No. 10/055,212.
U.S. Notice of Allowance / Allowability dated Jul. 3, 2006 in U.S. Appl. No. 10/851,932.
U.S. Notice of Allowance / Allowability dated Aug. 6, 2009 in U.S. Appl. No. 10/929,317.
U.S. Notice of Allowance / Allowability dated Sep. 23, 2009 in U.S. Appl. No. 10/929,715.
U.S. Notice of Allowance / Allowability dated Feb. 23, 2007 in U.S. Appl. No. 11/048,132.
U.S. Notice of Allowance / Allowability dated Jul. 26, 2007 in U.S. Appl. No. 11/332,532.
U.S. Notice of Allowance / Allowability dated Oct. 23, 2007 in U.S. Appl. No. 11/332,532.
U.S. Official Action dated Oct. 1, 2009 in U.S. Appl. No. 11/323,180.
U.S. Official Action dated May 13, 2010 in U.S. Appl. No. 11/323,180.
U.S. Official Action dated Jan. 23, 2008 in U.S. Appl. No. 11/323,181.
U.S. Official Action dated Sep. 30, 2008 in U.S. Appl. No. 11/323,181.
U.S. Official Action dated Feb. 19, 2009 in U.S. Appl. No. 11/323,181.
U.S. Official Action dated Aug. 20, 2009 in U.S. Appl. No. 11/323,181.
U.S. Official Action dated Oct. 23, 2009 in U.S. Appl. No. 11/323,185.
U.S. Official Action dated Jun. 3, 2010 in U.S. Appl. No. 11/323,185.
U.S. Official Action dated Oct. 1, 2009 in U.S. Appl. No. 11/323,186.
U.S. Official Action dated Sep. 11, 2009 in U.S. Appl. No. 11/323,818.
U.S. Official Action dated Nov. 10, 2009 in U.S. Appl. No. 11/323,820.
U.S. Notice of Allowance / Allowability dated Apr. 16, 2010 in U.S. Appl. No. 11/323,820.
U.S. Official Action dated Dec. 16, 2009 in U.S. Appl. No. 11/323,825.
U.S. Notice of Allowance / Allowability dated Sep. 18, 2009 in U.S. Appl. No. 11/324,033.
U.S. Official Action dated Nov. 30, 2009 in U.S. Appl. No. 11/324,034.
U.S. Official Action dated Jul. 7, 2010 in U.S. Appl. No. 11/323,034.
U.S. Official Action dated Oct. 5, 2009 in U.S. Appl. No. 11/324,154.
U.S. Official Action dated May 11, 2010 in U.S. Appl. No. 11/324,154.
U.S. Official Action dated Sep. 18, 2008 in U.S. Appl. No. 11/637,264.
U.S. Official Action dated Sep. 30, 2009 in U.S. Appl. No. 11/637,264.
U.S. Official Action dated Oct. 15, 2009 in U.S. Appl. No. 11/733,525.
U.S. Official Action dated Apr. 16, 2010 in U.S. Appl. No. 11/733,525.
U.S. Official Action dated Jul. 7, 2010 in U.S. Appl. No. 12/639,448.
U.S. Official Action dated Jul. 21, 2010 in U.S. Appl. No. 11/323,186.
U.S. Official Action dated Sep. 14, 2010 in U.S. Appl. No. 12/759,767.
U.S. Official Action dated Sep. 29, 2010 in U.S. Appl. No. 11/637,264.
U.S. Official Action dated Sep. 30, 2010 in U.S. Appl. No. 12/874,450.
U.S. Official Action dated Oct. 14, 2010 in U.S. Appl. No. 12/642,288.
U.S. Official Action dated Oct. 29, 2010 in U.S. Appl. No. 12/640,073.
U.S. Official Action dated Nov. 22, 2010 in U.S. Appl. No. 12/639,313.
U.S. Official Action dated Jan. 19, 2011 in U.S. Appl. No. 11/324,034.
Notice of Allowance/Allowability dated Dec. 23, 2010, in U.S. Appl. No. 12/837,785.
U.S. Final Official Action dated Oct. 27, 2010 in U.S. Appl. No. 11/733,525.
U.S. Final Official Action dated Mar. 2, 2011 in U.S. Appl. No. 12/759,767.
U.S. Notice of Allowance dated Mar. 8, 2011 in U.S. Appl. No. 12/639,313.
U.S. Notice of Allowance dated Dec. 27, 2010 in U.S. Appl. No. 11/637,264.
U.S. Official Action dated Feb. 7, 2011 in U.S. Appl. No. 11/952,510.
U.S. Final Official Action dated Mar. 11, 2011 in U.S. Appl. No. 12/640,073.
U.S. Notice of Allowance dated Apr. 14, 2011 in U.S. Appl. No. 12/639,313.
U.S, Official Action dated Mar. 21, 2011 in U.S. Appl. No. 12/642,288.
U.S. Notice of Allowance dated Mar. 29, 2011 in U.S. Appl. No. 12/837,785.

U.S. Official Action dated Apr. 13, 2011 in U.S. Appl. No. 12/874,450.
U.S. Notice of Allowance dated Apr. 15, 2011 in U.S. Appl. No. 11/637,264.
U.S. Official Action dated Jun. 17, 2011 in U.S. Appl. No. 12/642,288.
U.S. Official Action dated Aug. 19, 2011 in U.S. Appl. No. 12/909,145.
U.S. Official Action dated Sep. 14, 2011 in U.S. Appl. No. 11/952,510.
U.S. Notice of Allowance dated Nov. 14, 2011 in U.S. Appl. No. 12/642,288.
U.S. Official Action dated Feb. 3, 2012 in U.S. Appl. No. 12/909,145.
U.S. Official Action dated Jan. 30, 2012 in U.S. Appl. No. 11/952,510.
U.S. Official Action dated May 4, 2012 in U.S. Appl. No. 13/089,577.
U.S. Official Action dated Jun. 28, 2012 in U.S. Appl. No. 12/759,767.
U.S. Official Action dated Jun. 11, 2012 in U.S. Appl. No. 12/909,145.
U.S. Notice of Allowance dated Aug. 16, 2012 in U.S. Appl. No. 13/089,577.
U.S. Official Action dated Feb. 16, 2012 U.S. Appl. No. 13/249,977.
U.S. Official Action dated May 22, 2012 in U.S. Appl. No. 12/874,450.
U.S. Official Action dated Dec. 5, 2012 in U.S. Appl. No. 11/952,510.
U.S. Official Actino dated Oct. 11, 2012 in U.S. Appl. No. 12/854,475.
U.S. Notice of Allowance dated Nov. 16, 2012 in U.S. Appl. No. 12/759,767.
U.S. Official Action dated Nov. 14, 2012 in U.S. Appl. No. 12/874,450.
U.S. Official Action dated Nov. 21, 2012 in U.S. Appl. No. 12/909,145.

* cited by examiner

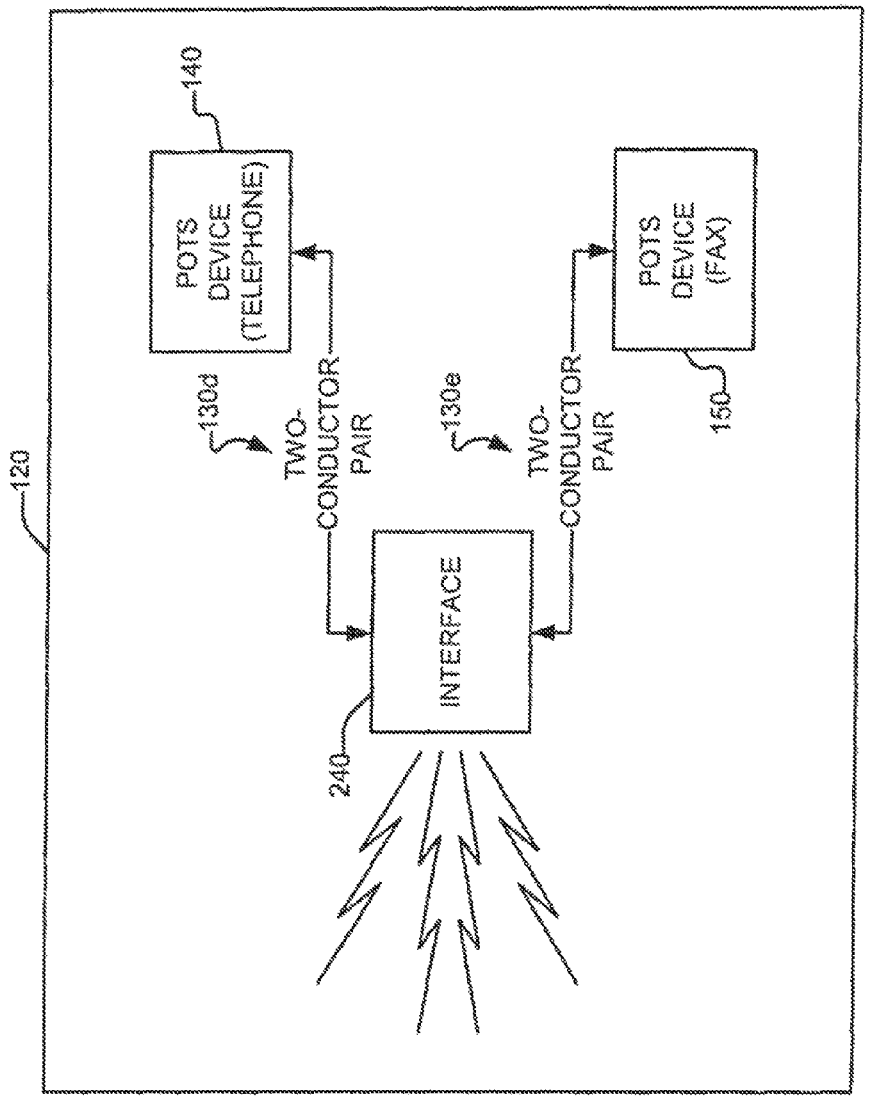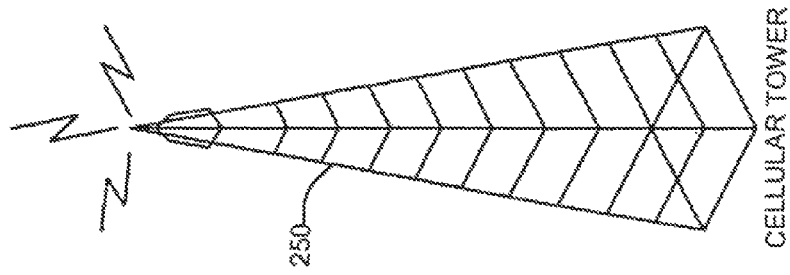
FIG. 2

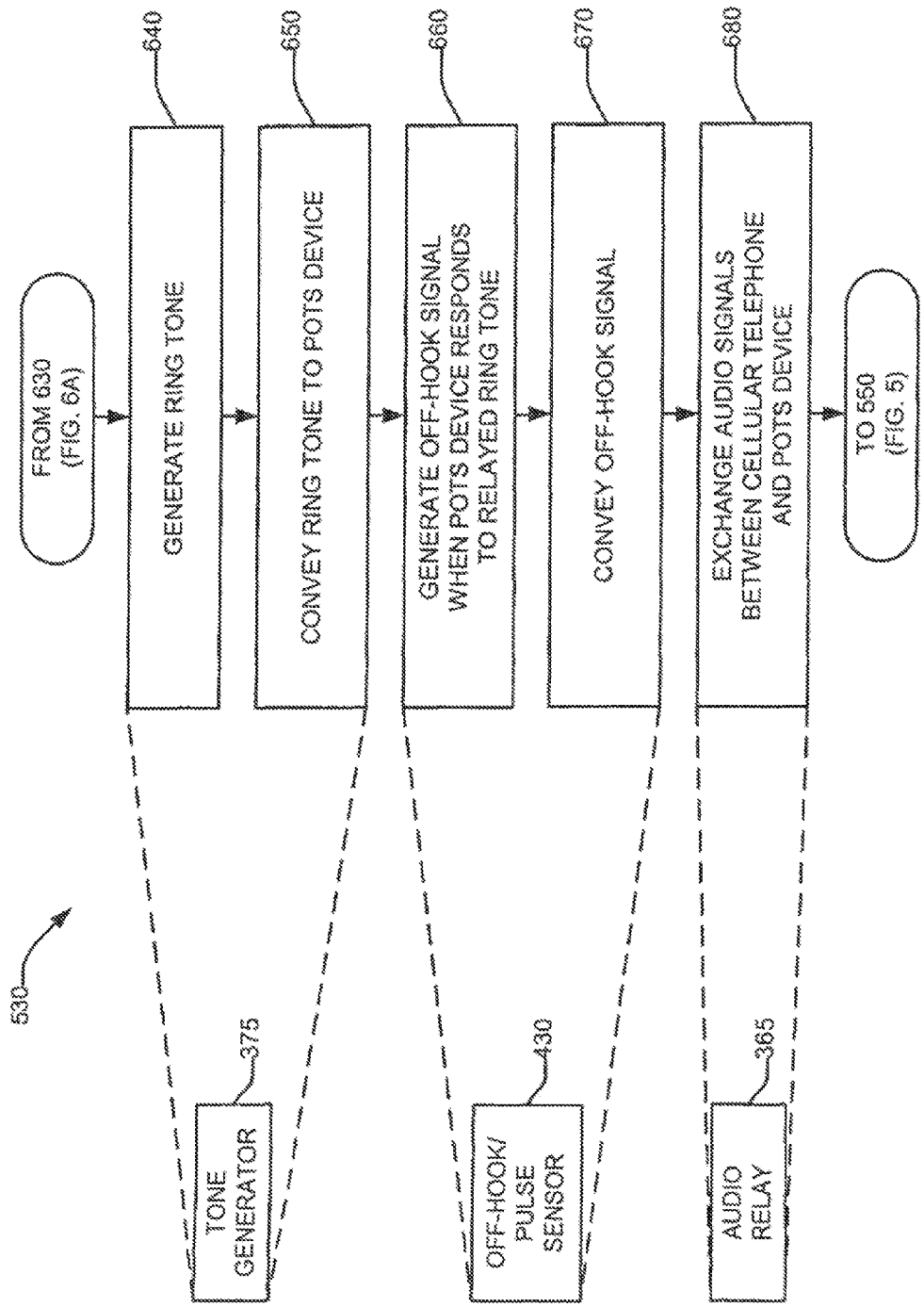

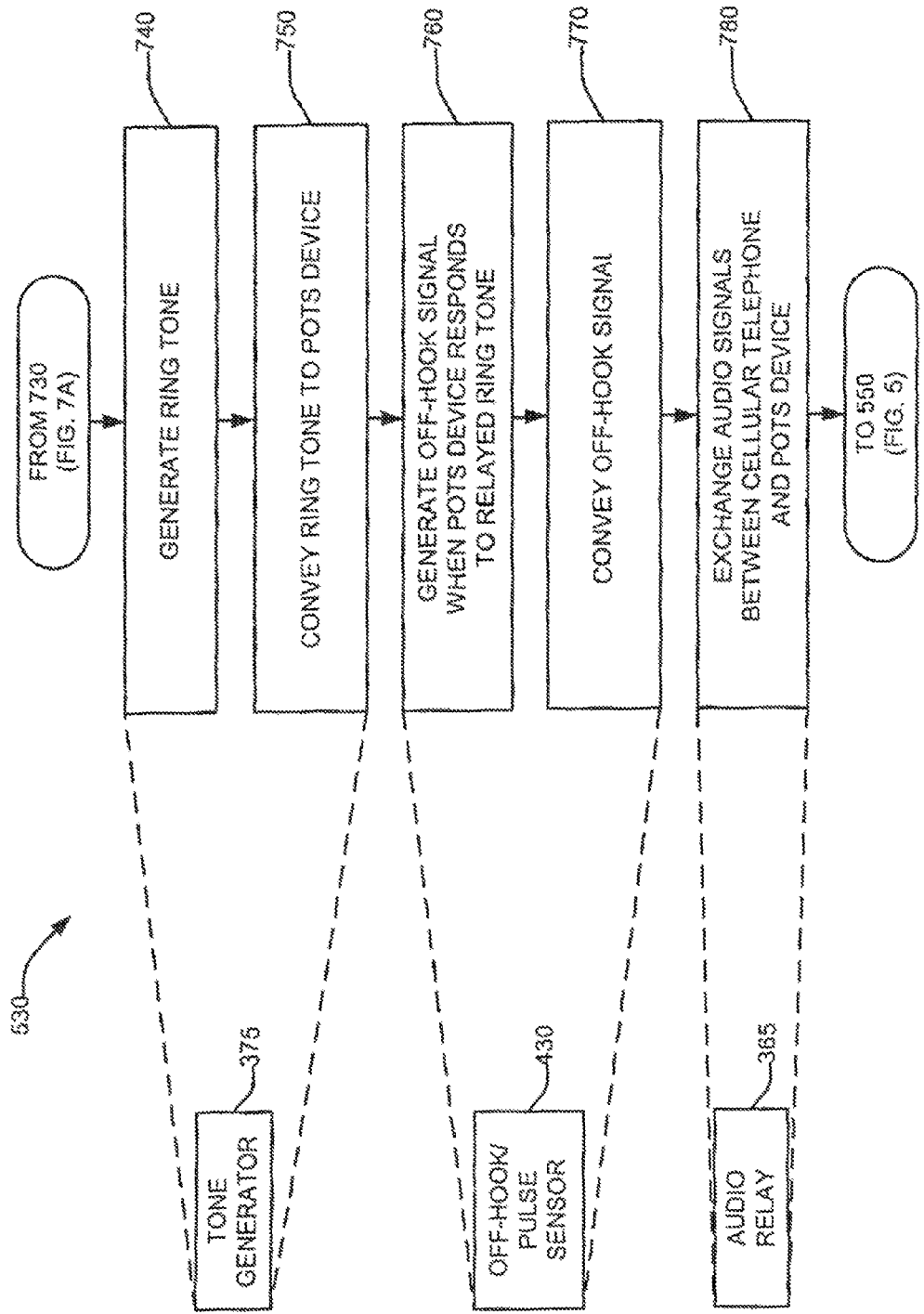

APPARATUS AND METHOD FOR SECURELY PROVIDING COMMUNICATIONS BETWEEN DEVICES AND NETWORKS

CROSS REFERENCE TO RELATED APPLICATIONS

This application is a continuation of U.S. patent application Ser. No. 11/323,181 filed Dec. 30, 2005 now abandoned entitled "Apparatus, Method, and Computer-Readable Medium for Securely Providing Communications Between Devices and Networks", now abandoned, which is a Continuation-In-Part Patent app. Ser. No. 10/195,197 now Application of U.S. Pat. No. 7,194,083, entitled "System and Method for Interfacing Plain Old Telephone System (POTS) Devices with Cellular Networks," filed on Jul. 15, 2002. These applications are herein incorporated by reference in their entirety.

This patent applications is related to the following U.S. Patents and U.S. Patent Applications: U.S. Pat. No. 7,623,654, entitled "Systems and Methods for Interfacing Telephony Devices with Cellular and Computer Networks," filed on Aug. 30, 2004; U.S. Pat. No. 7,522,722, entitled "System and Method for Interfacing Plain Old Telephone System (POTS) Devices with Cellular Devices in Communication with a Cellular Network," filed on Aug. 30, 2004; U.S. Pat. No. 7,200,424, entitled "Systems and Methods for Restricting the Use and Movement of Telephony Devices," filed on Aug. 30, 2004; U.S. Pat. No. 7,623,653, entitled "Systems and Methods for Passing Through Alternative Network Device Features to Plain Old Telephone System (POTS) Devices," filed on Aug. 30, 2004; U.S. Pat. No. 7,363,034, entitled "Cellular Docking Station," filed on Dec. 30, 2005; U.S. patent application Ser. No. 11/323,180, entitled "Apparatus, Method, and Computer-Readable Medium for Interfacing Communications Devices," filed on Dec. 30, 2005, now abandoned; U.S. patent application Ser. No. 11/323,820, entitled "Apparatus, Method, and Computer-Readable Medium for Interfacing Devices with Communications Networks," filed on Dec. 30, 2005, now abandoned; U.S. patent application Ser. No. 11/323,825, entitled "Apparatus and Method for Providing a User Interface for Facilitating Communications Between Devices," filed on Dec. 30, 2005, now abandoned; U.S. patent application Ser. No. 11/324,034, entitled "Plurality of Interface Devices for Facilitating Communications Between Devices and Communications Networks," filed on Dec. 30, 2005, now abandoned; U.S. patent application Ser. No. 11/323,182, entitled "Apparatus and Method for Providing Communications and Connection-Oriented Services to Devices," filed on Dec. 30, 2005, now abandoned; U.S. patent application Ser. No. 11/323,185, entitled "Apparatus and Method for Prioritizing Communications Between Devices," filed on Dec. 30, 2005, now abandoned; U.S. patent application Ser. No. 11/324,149, entitled "Apparatus, Method, and Computer-Readable Medium for Communication Between and Controlling Network Devices," filed on Dec. 30, 2005, now abandoned; U.S. patent application Ser. No. 11/323,186, entitled "Apparatus and Method for Aggregating and Accessing Data According to User Information," filed on Dec. 30, 2005, now abandoned; U.S. patent application Ser. No. 11/324,033, entitled "Apparatus and Method for Restricting Access to Data," filed on Dec. 30, 2005, now abandoned; U.S. patent application Ser. No. 11/323,818, entitled "Apparatus and Method for Providing Emergency and Alarm Communications," filed on Dec. 30, 2005, now abandoned; and U.S. patent application Ser. No. 11/324,154, entitled "Apparatus and Method for Testing Communication Capabilities of Networks and Devices," filed on Dec. 30, 2005, now abandoned. Each of the U.S. Patent Applications listed in this section is herein incorporated by reference in its entirety.

TECHNICAL FIELD

The present invention relates generally to telecommunications and, more particularly, to an apparatus, method, and computer-readable medium for securely providing communications between devices and networks.

BACKGROUND

Emerging communications network protocols and solutions, such as Voice over Internet Protocol (VoIP) and WI-FI, allow individuals to use VoIP and WI-FI compatible devices to communicate with each other over wide area networks, such as the Internet, in the same manner in which they currently communicate over the Public Switched Telecommunications Network (PSTN). However, in most instances, owners of legacy devices such as cellular telephones and Plain Old Telephone System (POTS) devices which are compatible with cellular networks and the PSTN are not capable of interfacing these devices to networks associated with the emerging communications network protocol and solutions. Thus, legacy device owners are inconvenienced by having multiple devices that lack functionality with the emerging communications network protocols and solutions. Owners of legacy devices cannot convert data sent via the emerging communications network protocols and solutions to formats compatible with the legacy devices. Moreover, users cannot dictate which devices should receive data and in what format the devices should receive the data. Providing communications between multiple devices and networks additionally presents unique data and device access security challenges.

SUMMARY

In accordance with exemplary embodiments, the above and other problems are solved by providing an apparatus, method, and computer-readable medium for securely providing communications between devices or networks. According to one aspect, an interface device provides communications between a first device and a second device. The interface device has an input for receiving data in a first format from the first device. A security program within the interface device operates to restrict access to at least one of the input and the output of the interface device. Logic within the interface device is configured to identify a second device for receiving the data from the first device. The logic identifies a second format that is compatible with the second device and translates the data to the second format. The interface device further has an output for transmitting the translated data to the second device.

The security program may provide a firewall or may require authentication prior to granting access to the interface device. The security program may also restrict access to the data through digital rights management. Through this aspect, the security program operates to allow transmission of the data to the second device if the second device has rights to the data. Additionally, the security program may operate to allow the data to be received at the input of the interface device if the interface device has rights to the data.

According to another aspect, a method provides for communications between a first communications network and a second communications network. Data is received at an input of the interface device, in a first format, from the first communications network. The second communications network for receiving the data is identified, as well as a second format compatible with the second network. The data is translated to the second format and a determination is made as to whether the second communications device is authorized to receive the data. If the second communications device is authorized to receive the data, then the translated data is transmitted from an output of the interface device to the second communications device. If the second communications device is not authorized to receive the data, then the second communications device is denied access to the data.

According to yet another aspect, a computer-readable medium has computer-executable instructions stored thereon which, when executed by a computer, cause the computer to determine whether data from a first device may be accessed. If the data from the first device may be accessed, then the data is received from a first device at an input of an interface device. The data is received from a first device in a first format. A second device for receiving the data is identified, as well as a second format compatible with the second device. The data is translated to the second format and transmitted to the second device. If the data from the first device may not be accessed, then access to the data is prevented. Determining whether the data may be accessed may be based on whether the second device or the interface device has a license for the data.

The above-described aspects may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize exemplary embodiments, will be apparent from a reading of the following detailed description and a review of the associated drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram showing one illustrative embodiment of the system for interfacing POTS devices with cellular networks;

FIGS. 6A and 6B are flowcharts showing one illustrative embodiment of the method associated with the conversion of cellular network compatible signals to POTS compatible signals;

FIGS. 7A and 7B are flowcharts showing another illustrative embodiment of the method associated with the conversion of cellular network compatible signals to POTS compatible signals;

DETAILED DESCRIPTION

Reference will now be made in detail to the description. While several illustrative embodiments of the invention will be described in connection with these drawings, there is no intent to limit it to the illustrative embodiment or illustrative embodiments disclosed therein. On the contrary, the intent is to cover all alternatives, modifications, and equivalents included within the spirit and scope of the invention as defined by the claims.

Figure 1:
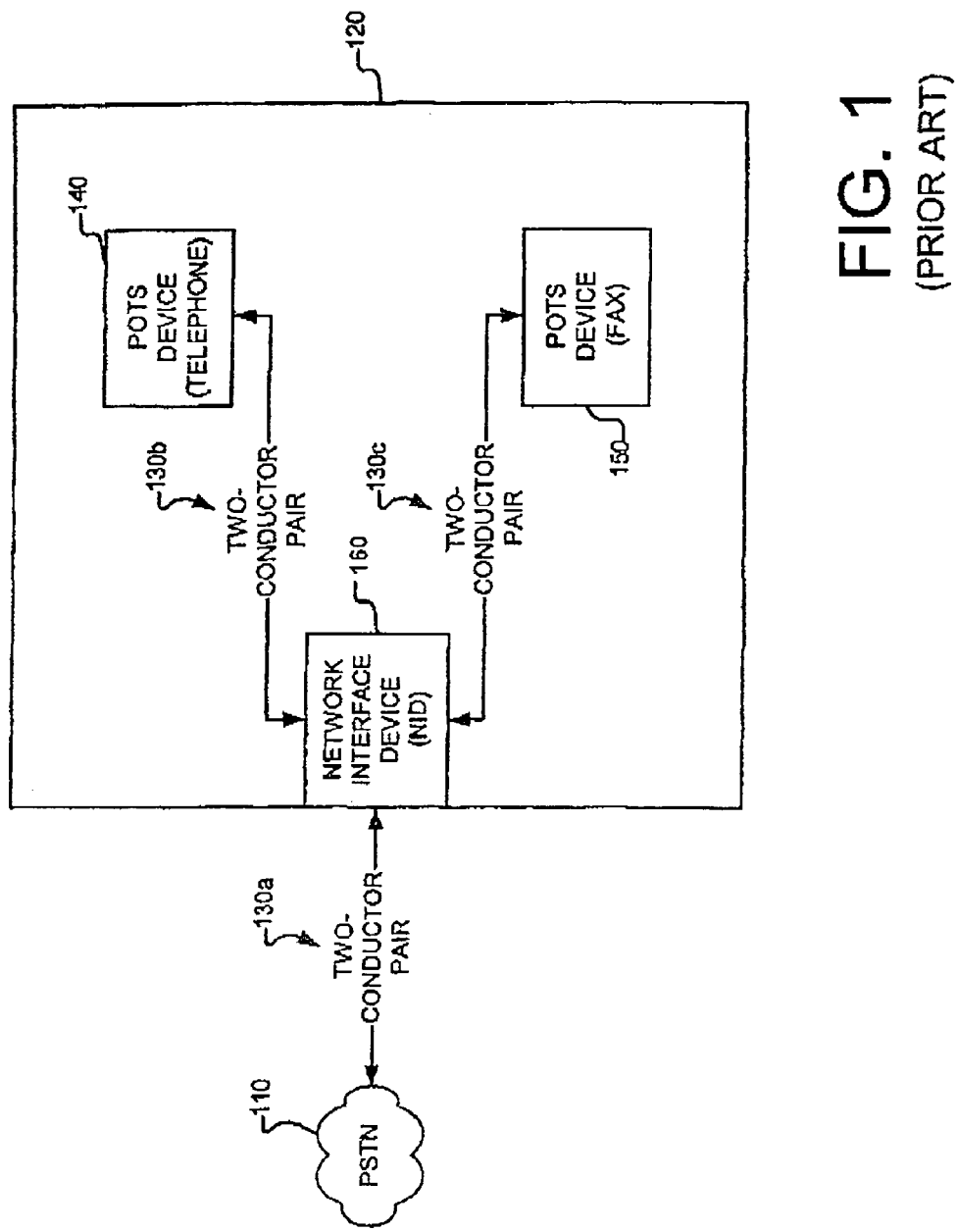
FIG. 1 is a block diagram showing a conventional POTS connection to a telephone company through a network interface device.

FIG. 1 is a block diagram showing a conventional POTS connection to a PSTN 110 through a Network Interface Device (NID) 160. As such connections are well understood by those skilled in the art, only a cursory discussion is presented here. As shown in FIG. 1, several POTS devices 140, 150 occupy a location 120 (e.g., home, business, etc.). Each POTS device 140, 150 is connected to the NID 160 by two-conductor pair wires 130b, 130c, also known as POTS pairs, or twisted pairs. The NID 160 serves as the interface between the POTS devices 140, 150 and the PSTN 110, wherein the NID 160 is connected to the PSTN 110 through at least a two-conductor pair 130a or landline 130a. As evident from FIG. 1, if the landline 130a is severed, or if the landline 130a is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface device 240, thereby permitting connection between the POTS devices 140, 150 and a cellular network. In this sense, the POTS devices 140, 150 are connected to the interface device 240, rather than an NID 160 (FIG. 1), by two-conductor pair wires 130*d*, 130*e*. Since the interface device 240 is a bridge between the POTS devices 140, 150 and the cellular network, the interface device 240 is configured to receive POTS compatible signals from the POTS devices 140, 150 and convert the POTS compatible signals to cellular network compatible signals, which are transmitted from the interface device 240 to the cellular tower 250. Additionally, the interface device 240 is configured to receive cellular network compatible signals from the cellular tower 250 and convert the cellular network compatible signals to POTS compatible signals, which are then forwarded to the POTS devices 140, 150 for use within the location 120. While a specific PSTN network is not shown in FIG. 2, it will be clear to one of ordinary skill in the art that the cellular tower 250 may be connected to a PSTN network, thereby permitting communication with other PSTN devices.

Figure 3:
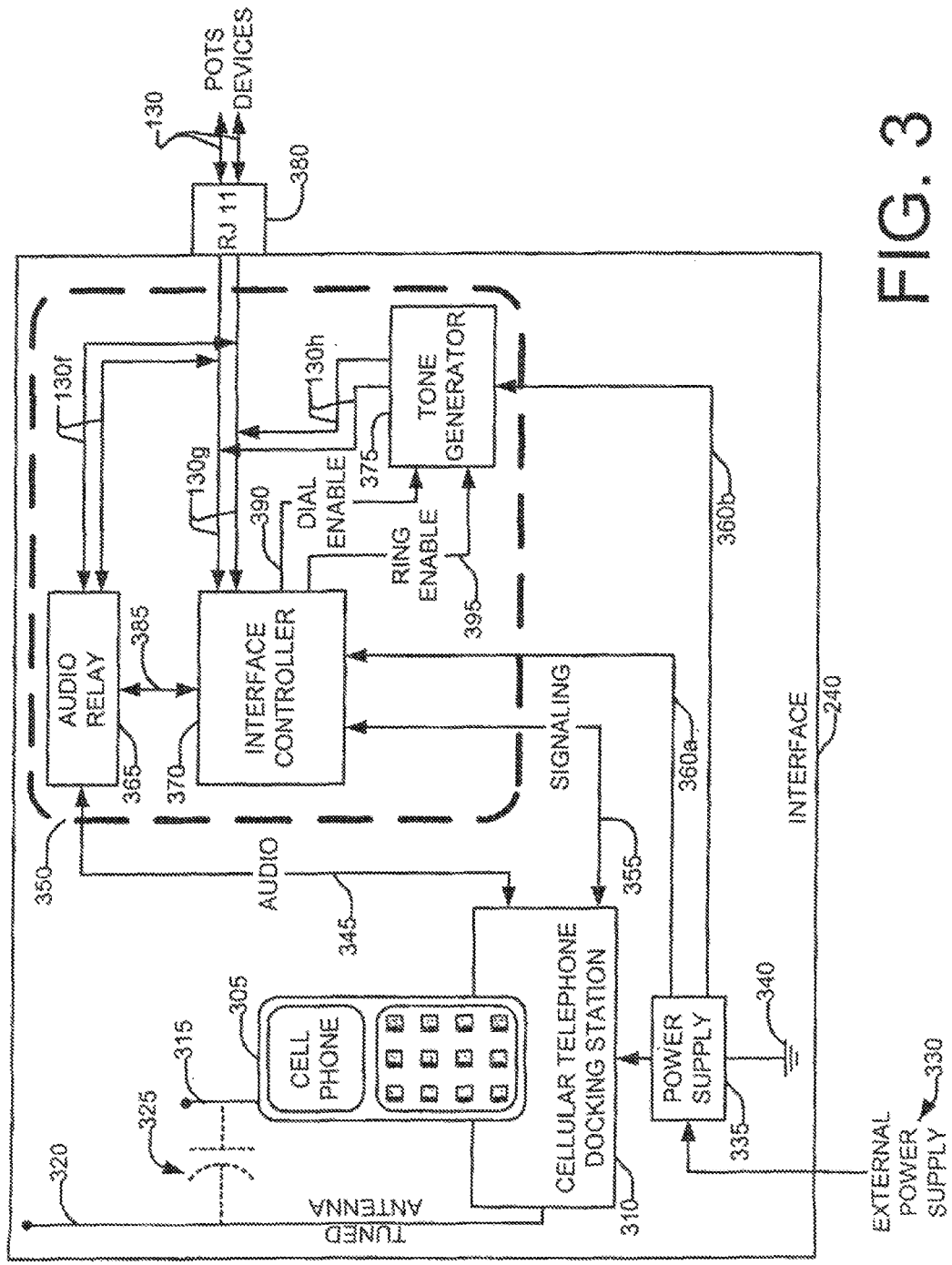
FIG. 3 is a block diagram showing one illustrative embodiment of the interface of FIG. 2.

FIG. 3 is a block diagram showing, in greater detail, a preferred illustrative embodiment of the interface device 240 of FIG. 2. In the preferred illustrative embodiment, the cellular network compatible signals are transmitted and received at the interface device 240 by a cellular telephone 305 while the POTS compatible signals are transmitted and received at the interface device 240 through a POTS interface 380, such as an RJ11 interface 380. Thus, in the preferred illustrative embodiment, the interface device 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitative coupling 325, as shown in FIG. 3. In addition to interfacing with a cellular telephone 305 through one of a variety of conventional interfaces (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number.

The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 310 may modify the signaling data on signaling line 355 appropriately (e.g., amplify, attenuate, reformat, etc.), or, alternatively, the cellular phone docking station 310 may relay the signaling data on signaling line 355 without modification. Regardless of whether or not the signaling data on signaling line 355 is modified, several aspects of the conveyed signal are discussed below, in greater detail, with reference to other components 350 associated with the interface device 240. Although the term line is used to describe various non-limiting embodiments, one skilled in the art will be aware that in some embodiments a line carrying signals may be a path on a separate communication media from other signals while the line carrying signals in other embodiments may be a path on a communications media into which many different signals are multiplexed using various multiplexing techniques understood to one of ordinary skill in the art. Furthermore, in other embodiments, the signals may be carried by wireless communication media.

In addition to the cellular phone docking station 310, the interface device 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2), the audio relay 365 receives analog-audio signals 345 from the cellular phone docking station 310 and transmits the analog-audio signals 345 to the POTS devices 140, 150 (FIG. 2) through the POTS interface (e.g., RJ11 interface) 380. Similarly, for outgoing analog-audio signals 345 (i.e., audio from the POTS devices 140, 150 (FIG. 2) to the cellular telephone 305), the analog audio signals 345 are received by the audio relay 365 through the POTS interface 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS interface 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface device 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface device 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data 355, therefore, instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS interface 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS interface 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
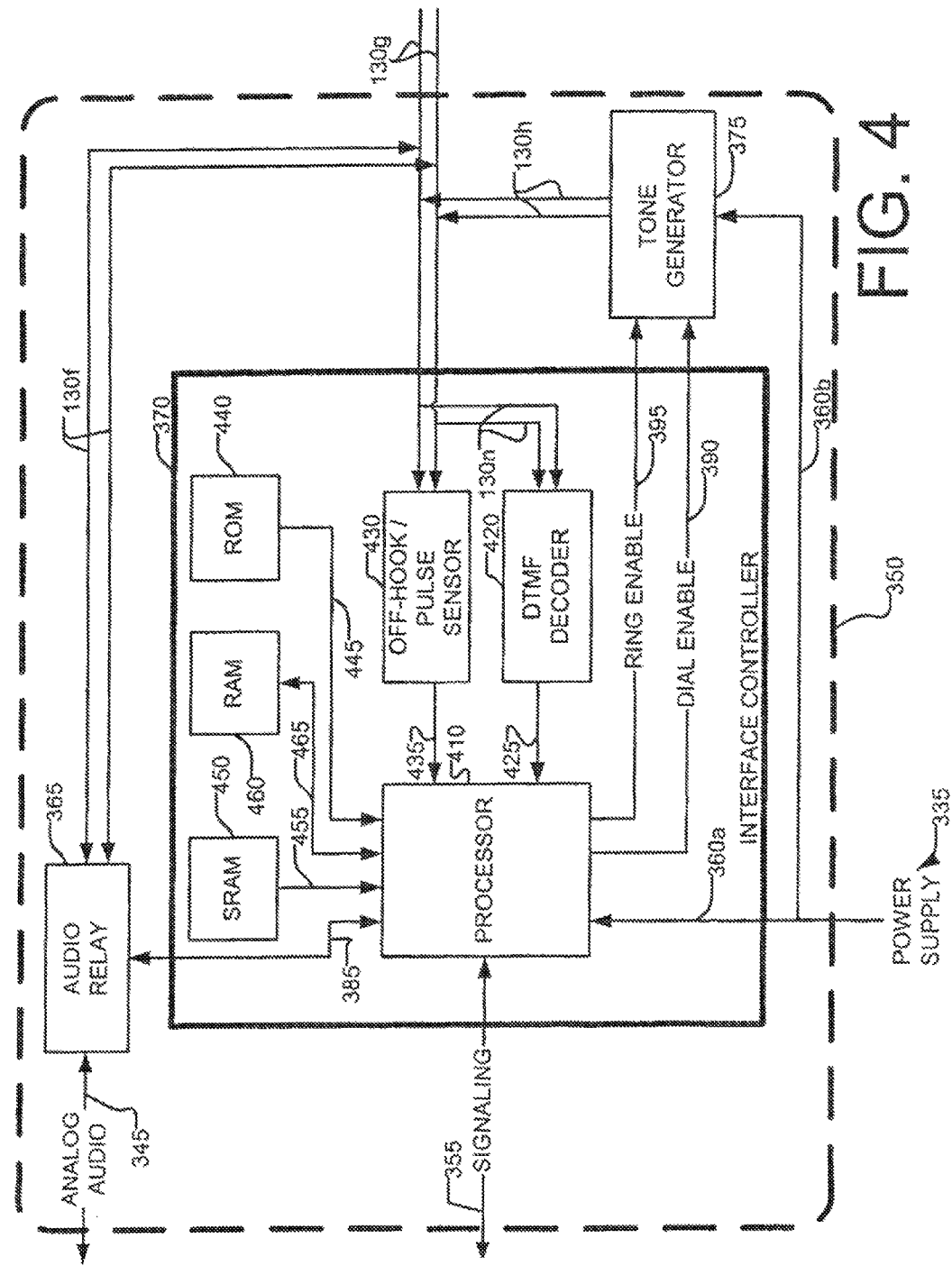
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, Random-Access Memory (RAM) 460, Read-Only Memory (ROM) 440, Static-Random-Access Memory (SRAM) 450, an off-hook/pulse sensor 430, and a Dual-Tone Multi-Frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS interface 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represents a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface device 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

Figure 5:
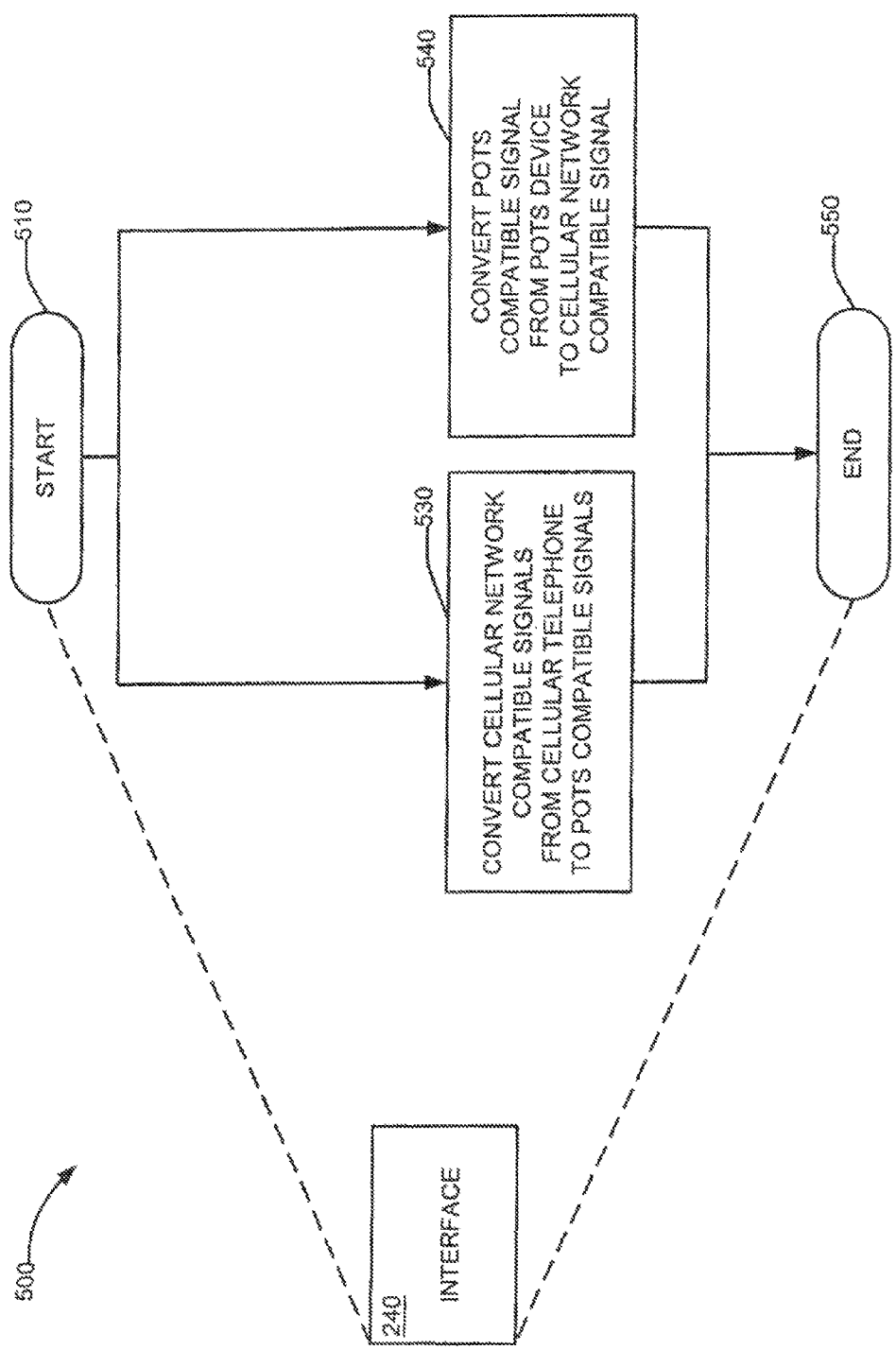
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface device 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface device 240.

Figure 6A:
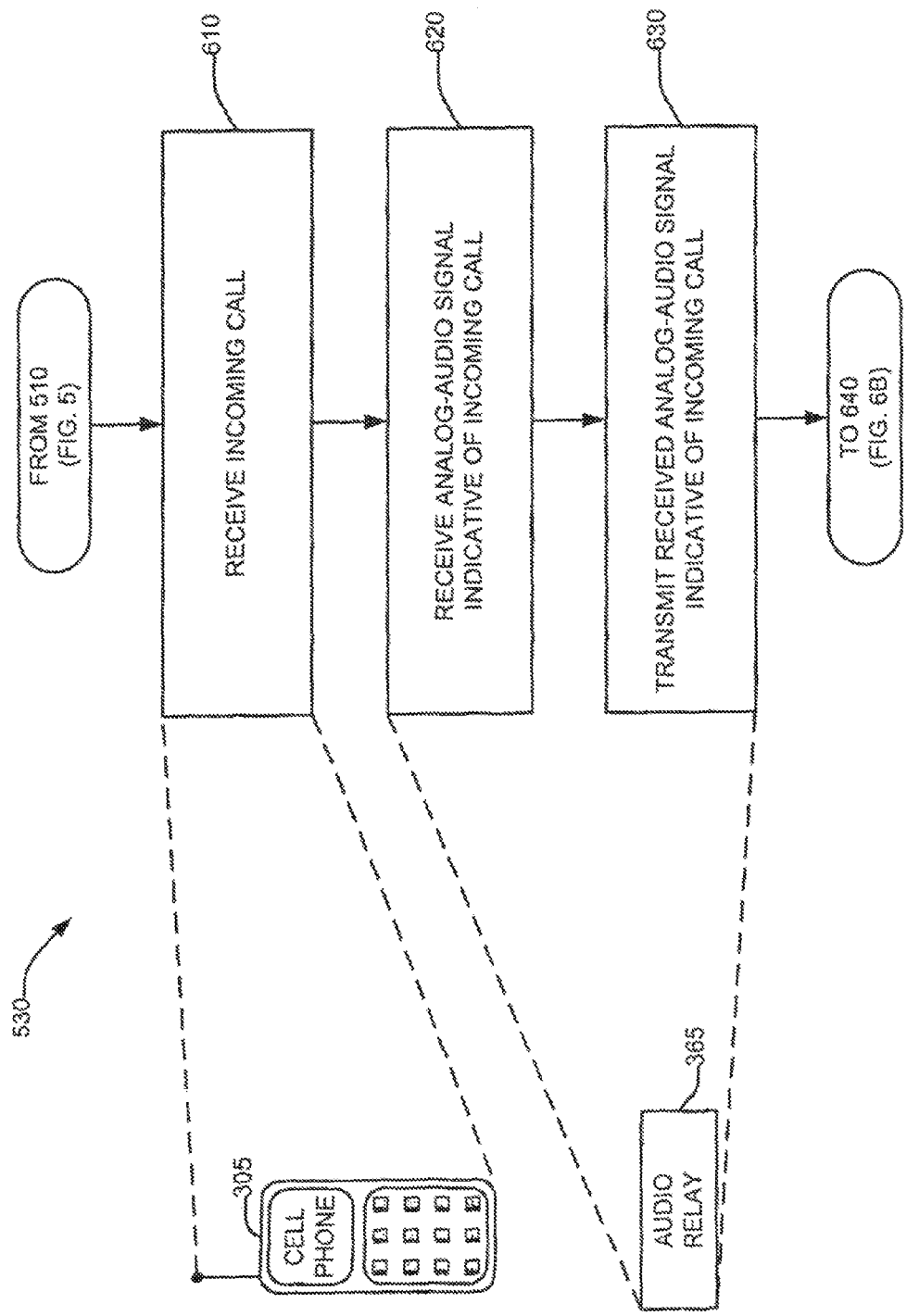

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
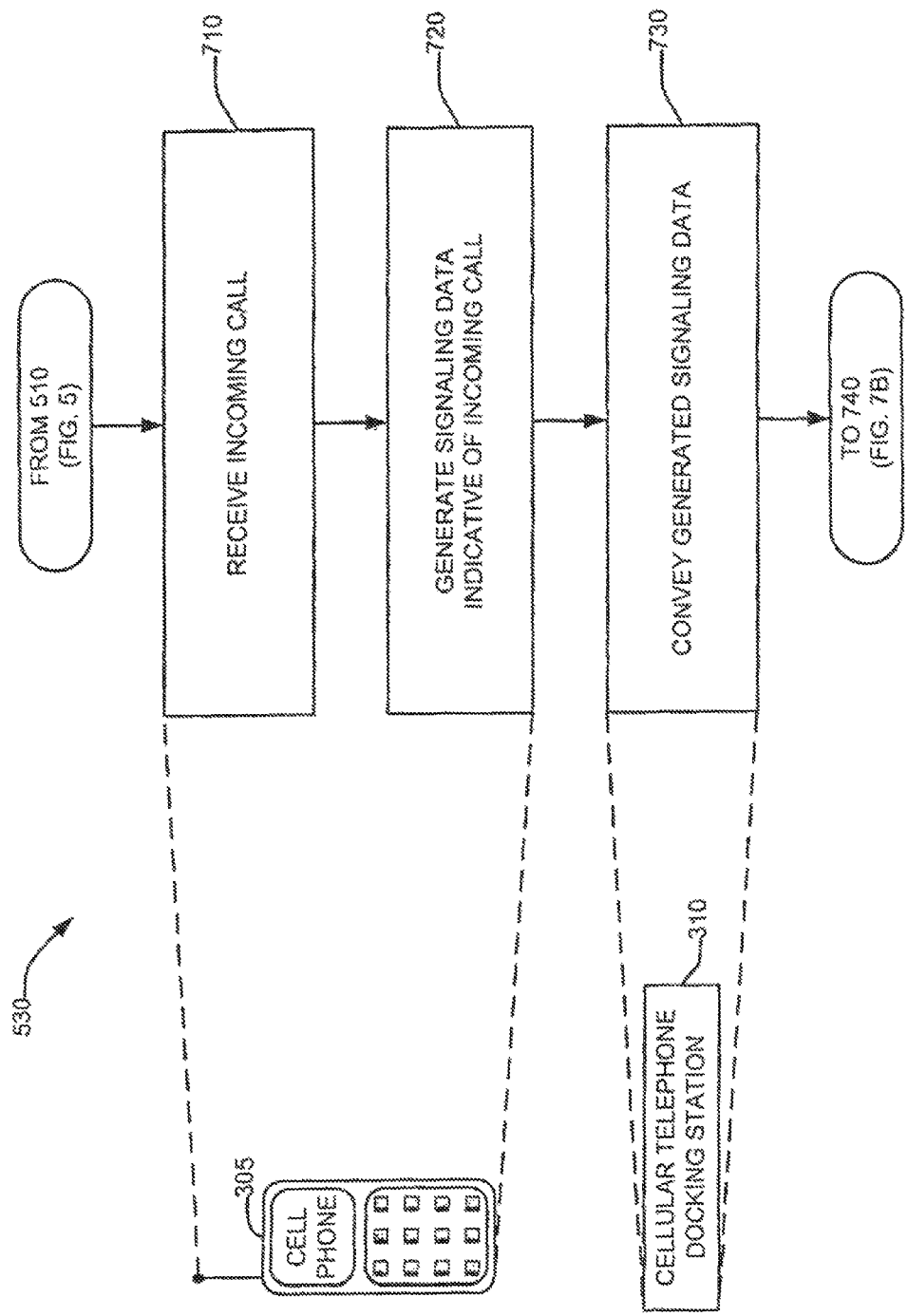

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 8:
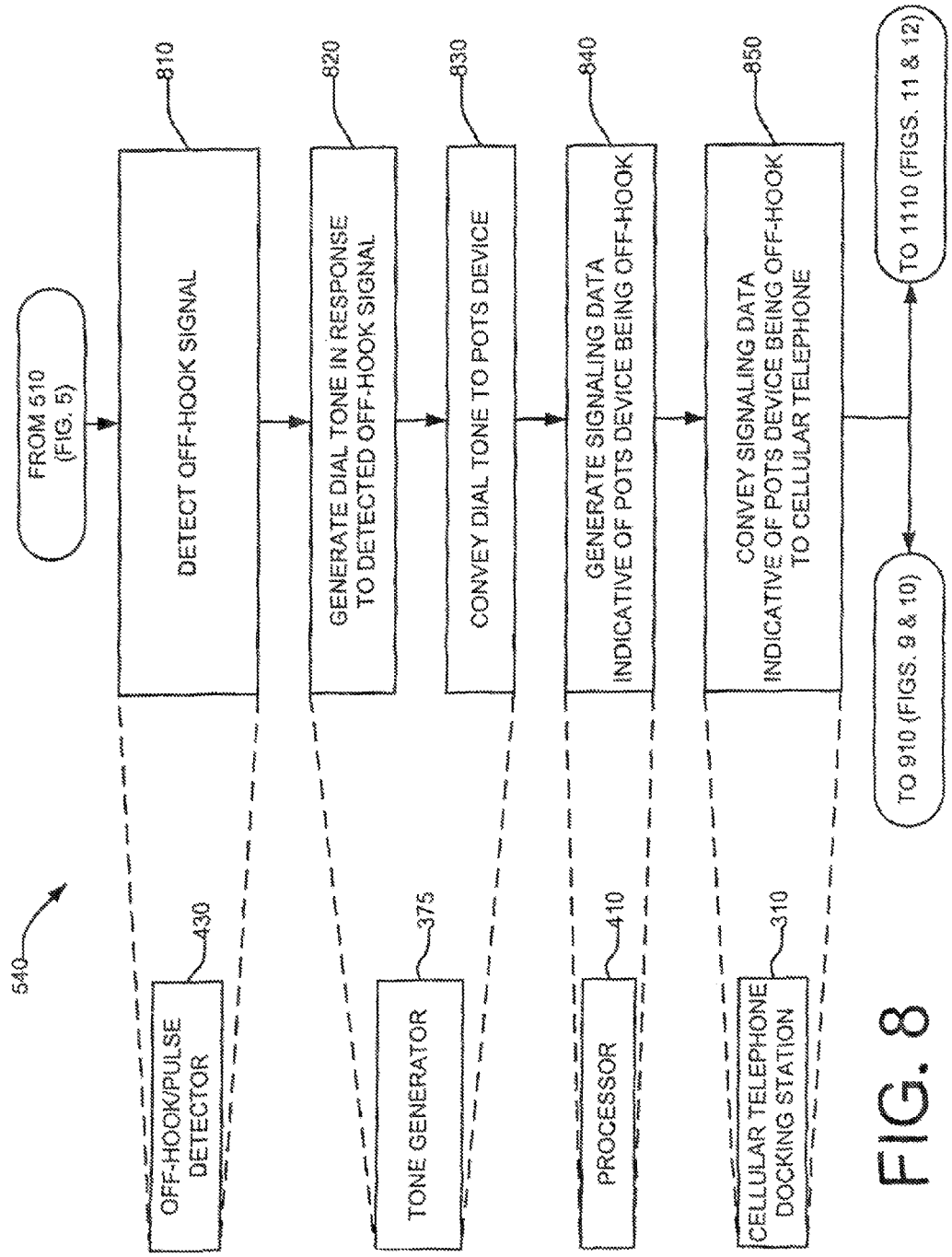
FIG. 8 is a flowchart showing several steps associated with the conversion of POTS compatible signals to cellular network compatible signals.

FIG. 8 is a flowchart showing several steps associated with the conversion 540 of POTS compatible signals to cellular network compatible signals. As described above, the interface device 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840 by the processor 410, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completed.

Figure 9:
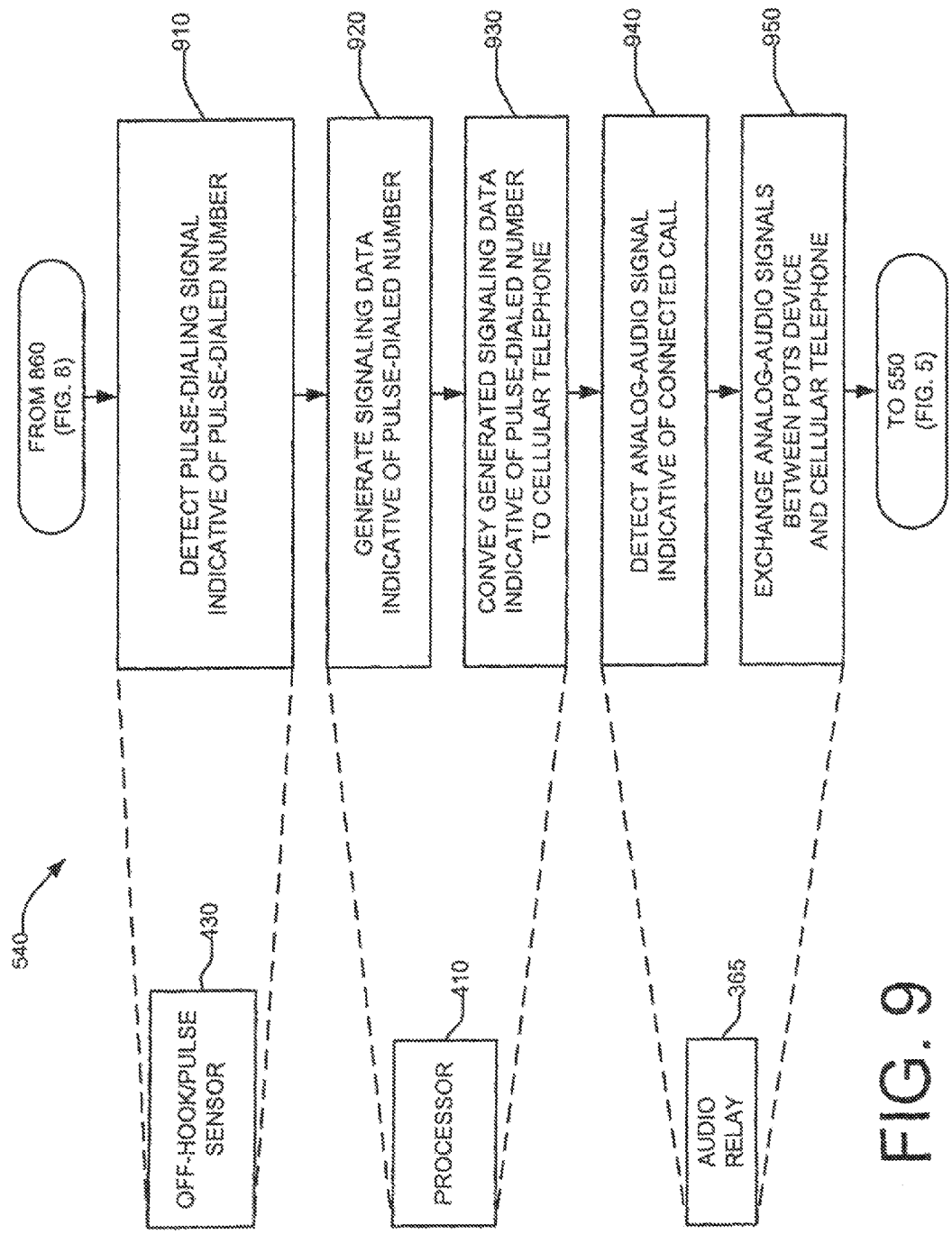
FIGS. 9 through 12 are flowcharts showing several illustrative embodiments of the method associated with the conversion of POTS compatible signals to cellular network compatible signals.
Figure 10:
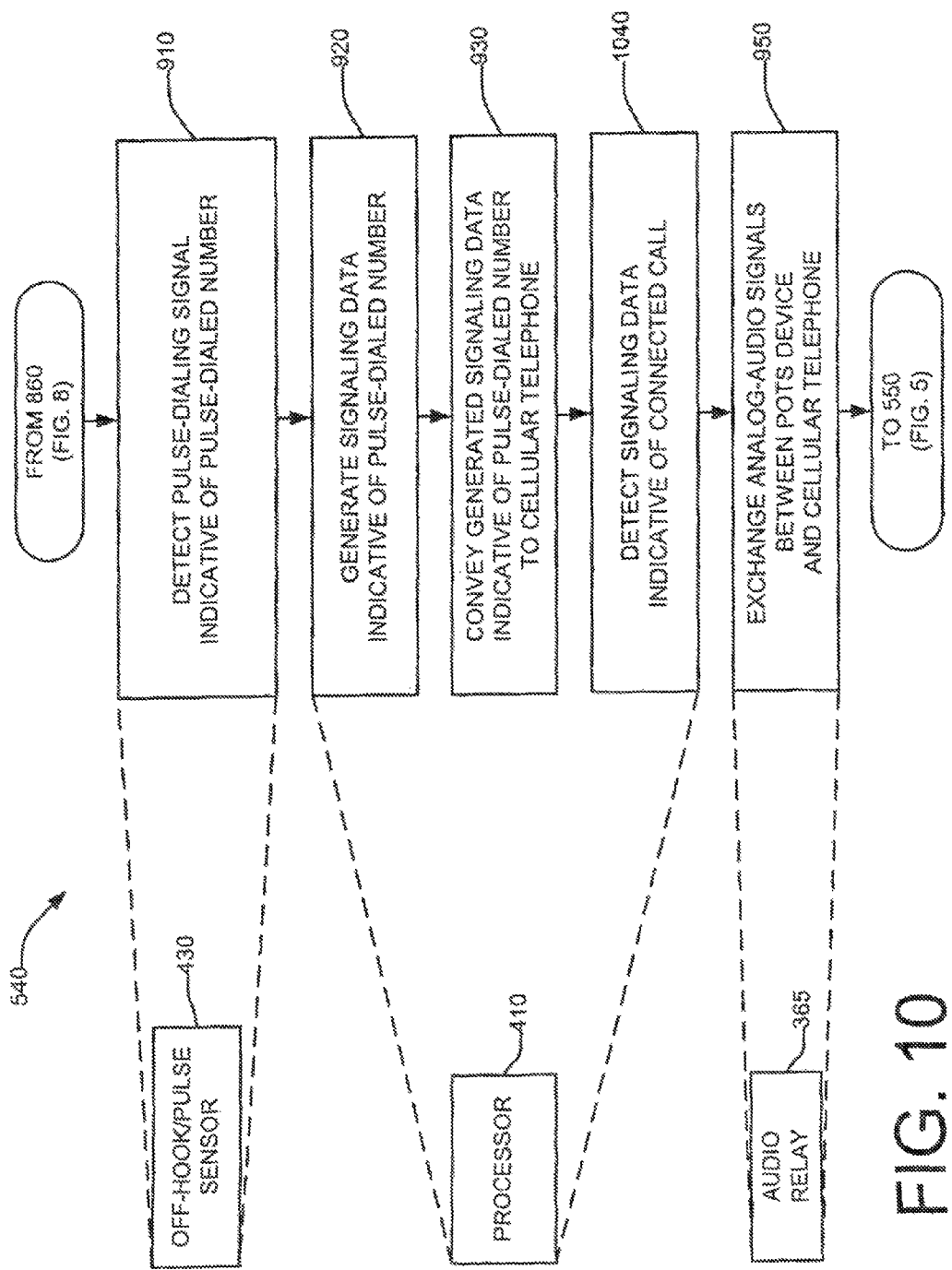

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
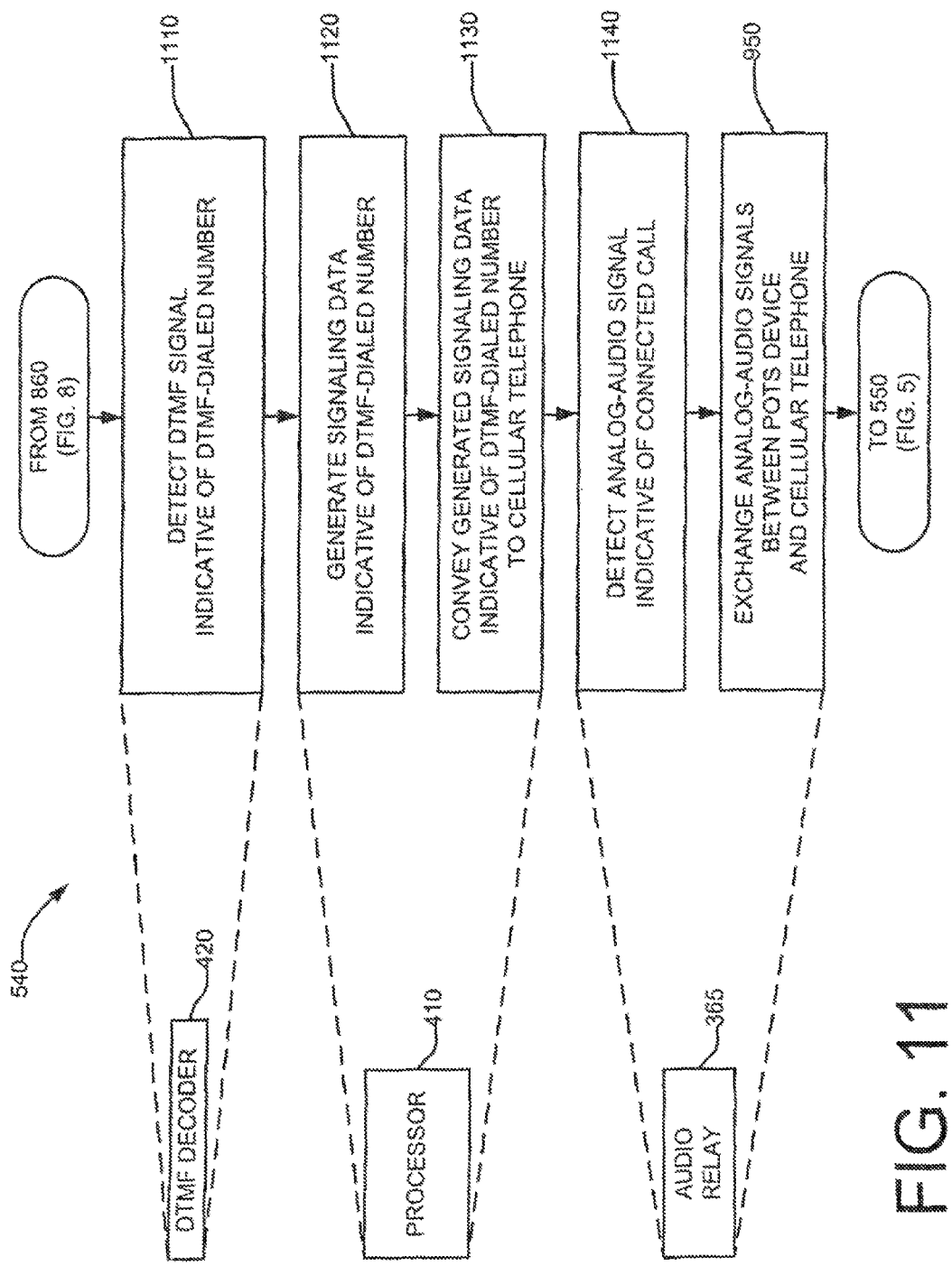
Figure 12:
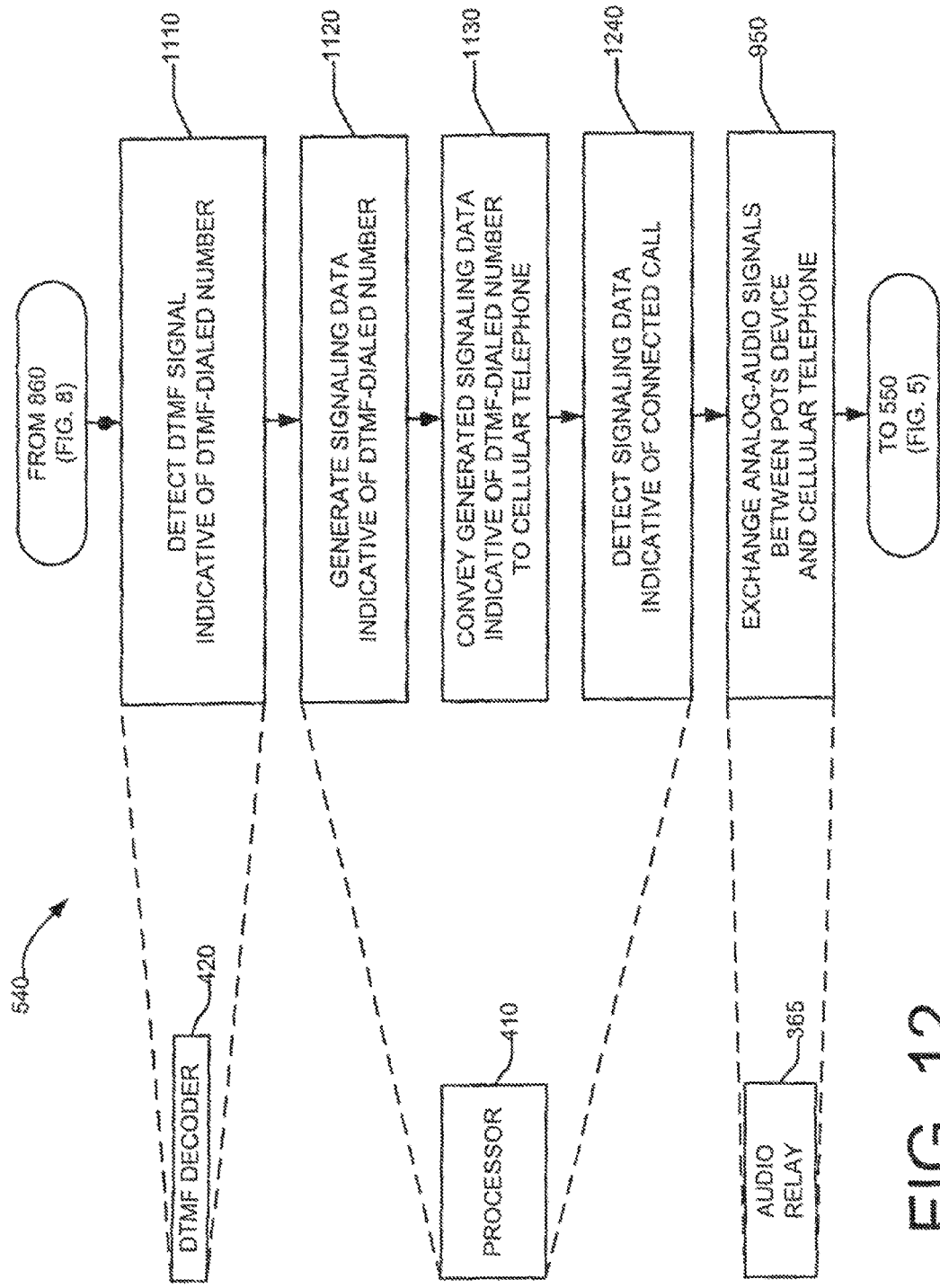

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an Application Specific Integrated Circuit (ASIC) having appropriate combinational logic gates, a Programmable Gate Array (PGA), a Field Programmable Gate Array (FPGA), etc.

Figure 13:
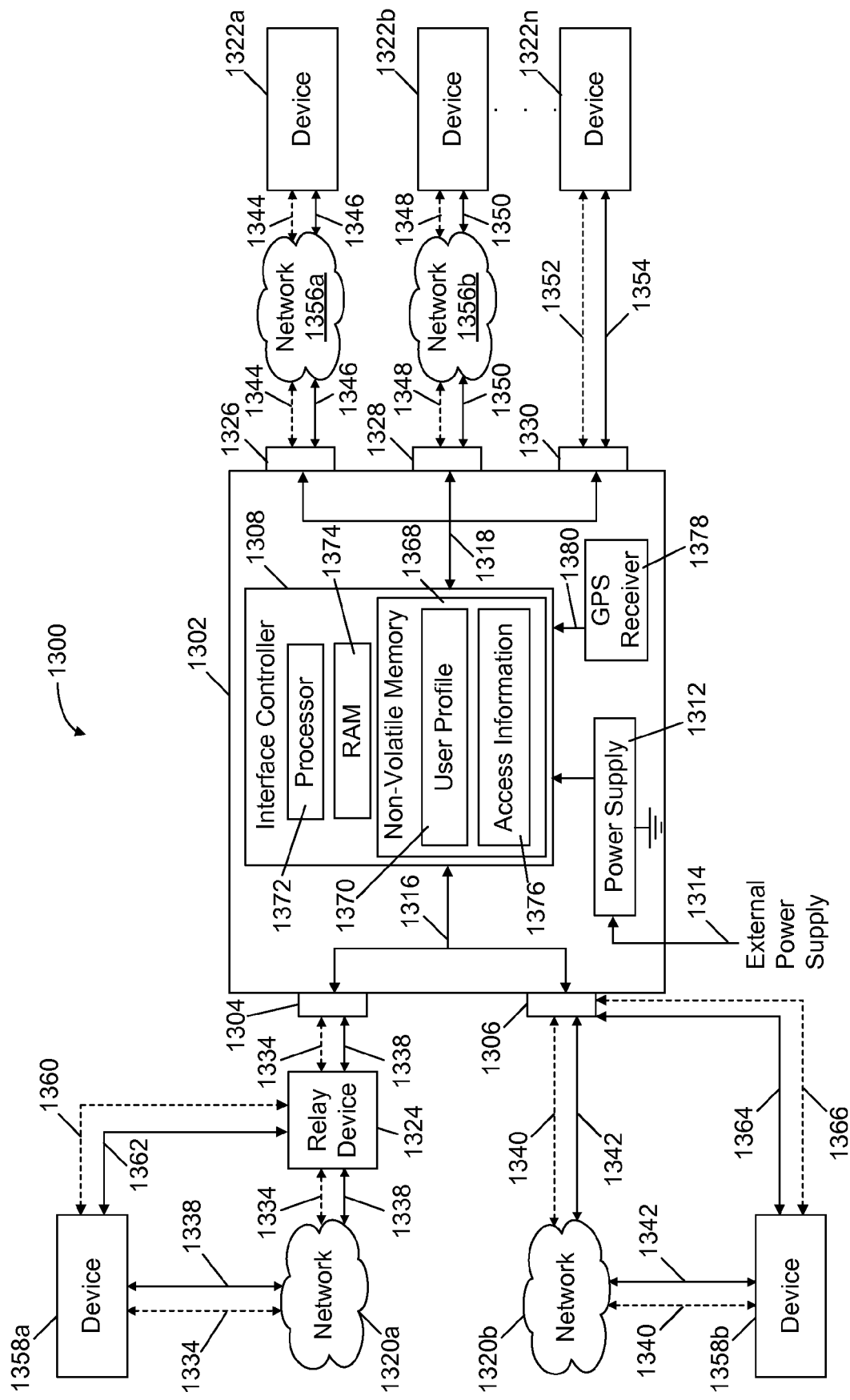
FIG. 13 is a block diagram showing an alternative illustrative embodiment of the interface device.

FIG. 13 is a block diagram showing a communications system 1300 including an interface device 1302 that is an alternative illustrative embodiment of the interface device 240 of FIG. 3. According to this embodiment, the interface device 1302 provides additional functionality, allowing any number of devices and networks to communicate with any number of additional devices and networks. In doing so, the interface device 1302 acts as a gateway for information, receiving and translating data between various formats for transmission over any type of transmission medium. As used herein, data comprises audio, video, voice, text, images, rich media, and any combination thereof.

Turning now to FIG. 13, the interface device 1302 provides communications between at least one of the devices 1358a, 1358b and at least one of the user devices 1322a-1322n. Communications provided between the devices 1358a, 1358b and the user devices 1322a-1322n via the interface device 1302 may include data comprising audio, video, voice, text, images, rich media, or any combination thereof. The devices 1358a, 1358b and the user devices 1322a-1322n may include communications devices capable of sending and receiving communications including, but not limited to, cellular telephones, VoIP phones, WiFi phones, POTS phones, computers, Personal Data Assistants (PDAs), Digital Video Recorders (DVRs), and televisions. According to one embodiment, the devices 1358a, 1358b may be associated with communications networks 1320a, 1320b such that communications provided by the devices are sent via the communications networks, and communications directed to the devices are delivered via the communications networks. Similarly, the user devices may be associated with communications networks such that communications provided by the user devices are sent via the communications networks, and communications directed to the user devices are delivered via the communications networks as illustrated by the user devices 1322a, 1322b and the communications networks 1356a, 1356b in FIG. 13. The communications networks 1320a, 1320b and 1356a, 1356b may include a wireless network such as, but not limited to, a Wireless Local Area Network (WLAN) such as a WiFi network, a Wireless Wide Area Network (WWAN), a Wireless Personal Area Network (WPAN) such as BLUETOOTH, a Wireless Metropolitan Area Network (WMAN) such a Worldwide Interoperability for Microwave Access (WiMax) network, or a cellular network. Alternatively, the communications networks 1320a, 1320b and 1356a, 1356b may be a wired network such as, but not limited to, a wired Wide Area Network (WAN), a wired (Local Area Network) LAN such as the Ethernet, a wired Personal Area Network (PAN), or a wired Metropolitan Area Network (MAN).

The interface device 1302 may include at least one interface 1306 for communicating directly with the device 1358b and for communicating with the communications network 1320b associated with the device 1358b. It will be appreciated by those skilled in the art that the interface 1306 may comprise a wireline or wireless adapter for communicating with the device 1358b and with the communications network 1320b, which may include one of the wired or wireless networks described above. The interface 1306 may conform to a variety of wired network standards for enabling communications between the interface device 1302 and the device 1358b via a wired signaling connection 1364 and between the interface device and the communications network 1320b via a wired signaling connection 1342. The interface 1306 may include, but is not limited to, a coaxial cable interface conformed to MPEG standards, POTS standards, and Data Over Cable Service Specifications (DOCSIS). The interface 1306 may also conform to Ethernet LAN standards and may include an Ethernet interface, such as an RJ45 interface (not shown). The interface 1306 may further include a twisted pair interface conformed to POTS standards, Digital Subscriber Line (DSL) protocol, and Ethernet LAN standards. Moreover, the interface 1306 may include a fiber optics interface conformed to Synchronous Optical Network (SONET) standards and Resilient Packet Ring standards. It will be appreciated that the interface 1306 may also conform to other wired standards or protocols such as High Definition Multimedia Interface (HDMI).

The interface 1306 may further conform to a variety of wireless network standards for enabling communications between the interface device 1302 and the device 1358b via a wireless signaling connection 1366 and between the interface device and the communications network 1320b associated with the device via a wireless signaling connection 1340. The interface 1306 may include a cellular interface conformed to Advanced Mobile Phone System (AMPS) standards, Global System for Mobile Communications (GSM) standards, and Cellular Digital Packet Data (CDPD) standards for enabling communications between the interface device 1302 and the communications network 1320b. The interface 1306 may also include a WiFi interface conformed to the 802.11x family of standards (such as 802.11a, 802.11b, and 802.11g). The interface 1306 may further include a WiMax interface conformed to the 802.16 standards. Moreover, the interface 1306 may include at least one of a satellite interface conformed to satellite standards or a receiver conformed to over-the-air broadcast standards such as, but not limited to, National Television System Committee (NTSC) standards, Phase Alternating Line (PAL) standards, and high definition standards. It will be appreciated that the interface 1306 may also conform to other wireless standards or protocols such as BLUETOOTH, ZIGBEE, and Ultra Wide Band (UWB). According to various embodiments, the interface device 1302 may include any number of interfaces 1306, each conformed to at least one of the variety of wired and wireless network standards described above for receiving data in a variety of formats from multiple devices and networks via multiple transmission media.

In an embodiment, the interface device 1302 may communicate with the device 1358a and with the communications network 1320a associated with the device 1358a via a relay device 1324. The relay device 1324 operates as a transceiver for the interface device 1302 to transmit and receive data to and from the device 1358a and the communications network 1320a. The relay device 1324 may modify the signaling data appropriately (e.g., amplify, attenuate, reformat, etc.), or, alternatively, the relay device 1324 may relay the signaling data without modification. Additionally, the relay device 1324 may be fixed, or may be portable to provide a user with a remote means for accessing data from a network or other device via the interface device 1302. Examples of fixed relay devices include, but are not limited to, a DSL modem, a cable modem, a set top device, and a fiber optic transceiver. Examples of portable relay devices include portable communications devices such as, but not limited to, a cellular telephone, a WiFi telephone, a VoIP telephone, a PDA, a satellite transceiver, or a laptop.

The relay device 1324 may also include a combination of a fixed device and a portable device. For example, the relay device 1324 may comprise a cellular telephone in combination with a docking station. The docking station remains connected to the interface device 1302, through wired or wireless means, while the cellular telephone may be removed from the docking station and transported with a user. In this embodiment, data received from the interface device 1302 at the cellular telephone may be taken with the user to be utilized at a remote location. While the cellular telephone is not docked with the docking station, communication would occur between the device 1358a and the interface device 1302 as well as between the communications network 1320a and the interface device via a direct connection or via an alternate relay device.

The device 1358a may provide data via signals which are transmitted either over a wireless signaling connection 1360 or over a wired signaling connection 1362 directly to the relay device 1324. Alternatively, the communications network 1320a associated with the device 1358a may provide data via signals which are transmitted either over a wireless signaling connection 1334 or over a wired signaling connection 1338 to the relay device 1324. The data may include audio, video, voice, text, rich media, or any combination thereof. Signals provided by the device 1358a over the wireless signaling connection 1360 to the relay device 1324 and signals provided by the communications network 1320a over the wireless signaling connection 1334 to the relay device may be in a format compatible with a cellular network, a WiFi network, a WiMax network, a BLUETOOTH network, or a satellite network. Signals provided by the device 1358a over the wired signaling connection 1362 to the relay device 1324 and signals provided by the communications network 1320a over the wired signaling connection 1338 may be in a format compatible with a DSL modem, a cable modem, a coaxial cable set top box, or a fiber optic transceiver.

Once the relay device 1324 receives data from the device 1358a or from the communications network 1320a, the relay device may transmit the data to an interface 1304 associated with the interface device 1302 via a signal over a wireless signaling connection 1334 or a wired signaling connection 1338. In one embodiment, the device 1358a and the communications network 1320a may communicate both directly with the interface device 1302 through the interface 1304 and with the interface device via the relay device 1324 through the interface 1304. The interface 1304 may conform to a variety of wireless network standards for enabling communications between the interface device 1302 and the relay device 1324. The interface 1304 may include a cellular interface conformed to AMPS, GSM standards, and CDPD standards for enabling communications between the interface device 1302 and the relay device 1324. The interface 1304 may also include a WiFi interface conformed to the 802.11x family of standards (such as 802.11a, 802.11b, and 802.11g). The interface 1304 may further include a WiMax interface conformed to the 802.16 standards. Moreover, the interface 1304 may include at least one of a cordless phone interface or a proprietary wireless interface. It will be appreciated by one skilled in the art that the interface 1304 may also conform to other wireless standards or protocols such as BLUETOOTH, ZIGBEE, and UWB.

The interface 1304 may also conform to a variety of wired network standards for enabling communications between the interface device 1302 and the relay device 1324. The interface 1304 may include, but is not limited to, microphone and speaker jacks, a POTS interface, a USB interface, a FIREWIRE interface, a HDMI, an Enet interface, a coaxial cable interface, an AC power interface conformed to Consumer Electronic Bus (CEBus) standards and X.10 protocol, a telephone interface conformed to Home Phoneline Networking Alliance (HomePNA) standards, a fiber optics interface, and a proprietary wired interface.

Signals provided by the relay device 1324 over the wireless signaling connection 1334 to the interface 1304 may be in a format compatible with a cellular network, a WiFi network, a WiMax network, a BLUETOOTH network, or a proprietary wireless network. Signals provided over the wired signaling connection 1338 to the interface 1304 may be in a format compatible with microphone and speaker jacks, a POTS interface, a USB interface, a FIREWIRE interface, an Enet interface, a coaxial cable interface, an AC power interface, a telephone interface, a fiber optics interface, or a proprietary wired interface.

Data received at the interfaces 1304, 1306 either directly from the devices 1358a, 1358b and the communications networks 1320a, 1320b or via the relay device 1324 is provided to an interface controller 1308 via a signaling line 1316. The interface controller 1308 is similar to the interface controller 370 of the interface device 240 described above with respect to FIG. 3. Once the interface controller 1308 receives data from the devices 1358a, 1358b or the communications networks 1320a, 1320b, the interface controller 1308 identifies one or more of the user devices 1322a-1322n and/or one or more of the communications networks 1356a, 1356b to receive the data, identifies a format compatible with the one or more receiving devices and/or receiving networks, and translates the current format of the data to the format compatible with the one or more receiving devices and/or receiving networks, which is further discussed below. After the data is translated, the interface controller 1308 provides the data to one or more of the interfaces 1326, 1328, and 1330 associated with the one or more devices and or networks identified to receive the translated data via a signaling line 1318. For example, if the interface controller 1308 identifies a POTS telephone as the device to receive the translated data, then the interface controller provides the data via the signaling line 1318 to an interface compatible with POTS standards.

The interface controller 1308 is further configured to receive data from the user devices 1322a-1322n and the communications networks 1356a, 1356b, identify one or more of the devices 1358a, 1358b and/or one or more of the communications network 1320a, 1320b to receive the data, identify a format compatible with the one or more receiving devices and/or receiving networks, and translate the current format of the data to the format compatible with the one or more receiving devices and/or receiving networks. Thus, the interface controller 1308 provides a bi-directional communication for all data transmitted between the devices 1358a, 1358b and the user devices 1322a-1322n, between the devices 1358a, 1358b and the communications networks 1356a, 1356b, between the communications networks 1320a, 1320b and the user devices 1322a-1322n, and between the communication networks 1320a, 1320b and the communications network 1356a, 1356b. In an illustrative embodiment, the interface controller 1308 is also configured to either amplify or attenuate the signals carrying the data transmitted between the communications networks and the devices.

The interfaces 1326, 1328, and 1330 may transmit the data to the user devices 1322a-1322n directly, as illustrated by the interface 1330 in FIG. 13, or the interfaces 1326, 1328, and 1330 may transmit the data to the communications networks 1356a, 1356b associated with the devices 1322a, 1322b, as illustrated by the interfaces 1326, 1328 in FIG. 13. In either case, the interfaces 1326, 1328, and 1330 transmit the data via a signal over wireless signaling connections 1344, 1348, and 1352 or wired signaling connections 1346, 1350, and 1354, respectively. In another embodiment, one of the interfaces 1326, 1328, and 1330 may communicate the data to two or more of the devices 1322a-1322n and/or communications networks 1356a, 1356b.

The interfaces 1326, 1328, and 1330 may conform to a variety of wireless network standards for enabling communications between the interface device 1302 and the devices 1322a-1322n or the communications networks 1356a, 1356b. The interfaces 1326, 1328, and 1330 may include at least one cellular interface conformed to AMPS, GSM standards, and CDPD standards for enabling communications between the interface device 1302 and the devices 1322a, 1322b, and 1322n. The interfaces 1326, 1328, and 1330 may also include at least one WiFi interface conformed to the 802.11x family of standards (such as 802.11a, 802.11b, and 802.11g). The interfaces 1326, 1328, and 1330 may further include at least one WiMax interface conformed to the 802.16 standards. Moreover, the interfaces 1326, 1328, and 1330 may include at least one of a cordless phone interface or a proprietary wireless interface. It will be appreciated by those skilled in the art that the interfaces 1326, 1328, and 1330 may also conform to other wireless standards or protocols such as BLUETOOTH, ZIGBEE, and UWB.

The interfaces 1326, 1328, and 1330 may also conform to a variety of wired network standards for enabling communications between the interface device 1302 and the devices 1322a-1322n or the communications networks 1356a, 1356b. The interfaces 1326, 1328, and 1330 may include, but are not limited to, microphone and speaker jacks, a POTS interface, a USB interface, a FIREWIRE interface, a HDMI, an Enet interface, a coaxial cable interface, an AC power interface conformed to CEBus standards and X.10 protocol, a telephone interface conformed to HomePNA standards, a fiber optics interface, and a proprietary wired interface.

Signals provided by the interfaces 1326, 1328, and 1330 over the wireless signaling connections 1344, 1348, and 1352 may be in a format compatible with a cellular network, a WiFi network, a WiMax network, a BLUETOOTH network, or a proprietary wireless network. Signals provided over the wired signaling connections 1346, 1350, and 1354 may be in a format compatible with microphone and speaker jacks, a POTS interface, a USB interface, a FIREWIRE interface, a HDMI, an Enet interface, a coaxial cable interface, an AC power interface, a telephone interface, a fiber optics interface, or a proprietary wired interface.

For some interfaces such as, but not limited to, POTS interfaces, functionality of the interfaces that provide service from a network to a user device is different from the functionality of the interfaces that receive service from the network. Interfaces that deliver service from a network to a user device are commonly referred to as Foreign eXchange Subscriber (FXS) interfaces, and interfaces that receive service from the network are commonly referred to as Foreign eXchange Office (FXO) interfaces. In general, the FXS interfaces provide the user device dial tone, battery current, and ring voltage, and the FXO interfaces provide the network with on-hook/off-hook indications. In an embodiment, the interfaces 1326, 1328, and 1330 are the FXS interfaces that deliver data from the communications networks 1320*a*, 1320*b* to the user devices 1322*a*-1322*n*, and the interfaces 1304,1306 are the FXO interfaces that receive data from the communications networks 1320*a*, 1320*b*.

As mentioned above, the interface controller 1308 may control the translation of the data received at the interface device 1302 from one format to another. In particular, the interface controller 1308 is configured to control the behavior of the relay device 1324 and any additional components necessary for translating data in order to effectuate the translation of the data from one format to another format. For example, as described above, for translating between POTS compatible signals and cellular network compatible signals, the interface controller 1302 may communicate with an audio relay and a tone generator, and includes an off-hook/pulse sensor and a DTMF decoder. The interface device 1302 shares the same capabilities for translating between POTS compatible signals and cellular network compatible signals as described above with regard to the interface device 240 illustrated in FIG. 3, but the interface device 1302 also has additional translation capabilities for translating between any number and type of other signals. Consequently, the interface device 1302 may comprise any components necessary for a given translation.

According to one embodiment, the interface controller 1308 comprises a processor 1372, RAM 1374, and non-volatile memory 1368 including, but not limited to, ROM and SRAM. The non-volatile memory 1368 is configured to store logic used by the interface controller 1308 to translate data received at the interface device 1302. In this sense, the non-volatile memory 1368 is configured to store the program that controls the behavior of the interface controller 1308, thereby allowing the interface controller 1308 to translate data signals from one format to another. The non-volatile memory 1368 is also adapted to store configuration information and may be adapted differently depending on geographical area and signal formats and protocols. The configuration information stored on the non-volatile memory 1368 of the interface controller 1308 may include default configuration information originally provided on the interface device 1302. In another embodiment, the configuration information stored on the non-volatile memory 1368 may include a user profile 1370 associated with one or more of the devices 1322*a*-1322*n*, one or more of the communications networks 1356*a*, 1356*b*, or a combination thereof, as will be discussed further with regard to FIG. 16. The user profile 1370 may include user preferences established by one or more users of the interface device 1302 regarding formats in which data is to be transmitted and received, translations to be performed on the data, the devices and networks to send and receive the data, as well as any other configuration information associated with transmitting data via the interface device 1302. The RAM is configured to store temporary data during the running of the program by the processor, allowing the RAM to operate as a memory buffer for times in which the data is being received at a rate that is faster than the interface device 1302 can determine a proper recipient, translate the data, and transmit the data to the proper recipient. The processor is configured to generate signaling data on the signaling line 1316, which may instruct the relay device 1324 to dial a number, connect to a network, etc.

As mentioned above, the interface device 1302 contains logic within the interface controller 1308 that is used by the interface controller to translate data received at the interface device. The logic may include any number and types of data translation standards. In particular, the interface controller 1308 uses the logic to translate the data received at one of the interfaces 1304, 1306, 1326, 1328, 1330 of the interface device 1302 from at least one format to at least one other format. How the data received at the interface device 1302 is translated may be based on any one or combination of factors. According to one embodiment, the type of data translation may depend on the source and destination of the data. It should be understood that although the description contained herein describes the devices 1358*a*, 1358*b* and the communications networks 1320*a*, 1320*b* as the source devices and the source networks, respectively, and the user devices 1322*a*-1322*n* and the communications networks 1356*a*, 1356*b* as the destination devices and the destination networks, respectively, embodiments contemplate data transfer from the user devices 1322*a*-1322*n* and from the communications networks 1356*a*, 1356*b* to the devices 1358*a*, 1358*b* and to the communications networks 1320*a*, 1320*b* as well as bidirectional communication and data transfer. As an example, data arriving at the interface device 1302 that is directed to a POTS device would be translated to a format compatible for transmission over the appropriate medium associated with the POTS device.

According to another embodiment, the type of data translation may depend on default configuration information originally provided on the interface device 1302. For example, the default configuration information may be provided by a service provider offering the interface device 1302 to customers. In yet another embodiment, the type of data translations may depend on a user profile stored on the interface device 1302. As discussed above, the user profile may be configured by a user of the interface device 1302 to include user preferences regarding formats in which data is to be transmitted and received, translations to be performed on the data, the devices and networks to send and receive the data, as well as any other configuration information associated with transmitting data via the interface device 1302.

When configuring the user profile, the user may specify the appropriate destination device, transmission medium, and filtering options for data received under any variety of circumstances. For example, the user may configure the interface device 1302 such that all incoming rich media content is translated for transmission to and display on the device 1322*b* which, as discussed above, may include a television. The user might configure the interface device 1302 such that only media from specific websites be allowed to download to a device or network via the interface device 1302. In doing so, the user profile might include access data such as a user name and password that will be required from the user prior to accessing a specific type or quantity of data. The user profile may additionally contain priorities for translation and transmission when multiple data signals and data formats are received at the interface device 1302. For example, a user may specify that audio data be given transmission priority over other types of data. The priority may be based on a specific transmitting or receiving device, the type of transmitting or receiving device, the format of the data being transmitted or received, the transmission medium of the transmitting or receiving signals, or any other variable. As used herein, the format associated with the data may include a transmission medium associated with the signal carrying the data, a standard associated with the data, or the content of the data.

It should be understood by one skilled in the art that data translations as discussed above may include several different types of data conversion. First, translating data may include converting data from a format associated with one transmission medium to another transmission medium. For example, audio data from an incoming telephone call may be translated from a wireless, cellular signal to a twisted pair wiring signal associated with POTS telephones. Next, data translation may include converting data from one type to another, such as when voice data from a telephone or network is translated into text data for display on a television or other display device. For example, data translation may include, but is not limited to MPEG 2 translation to MPEG 4, or the reverse, Synchronized Multimedia Interface Language (SMIL) to MPEG 1, or Macromedia Flash to MPEG 4.

Additionally, data translation may include content conversion or filtering such that the substance of the data is altered. For example, rich media transmitted from one or more of the devices 1358*a*, 1358*b* or one or more of the communications networks 1320*a*, 1320*b* may be filtered so as to extract only audio data for transmittal to one or more of the user devices 1322*a*-1322*n* or one or more of the communications networks 1356*a*, 1356*b*. Translation may further include enhancing the data, applying equalizer settings to the data, improving a poor quality signal carrying data based on, e.g., known characteristics of the device providing the data signal, degrading the data signal, or adding a digital watermark to the data to identify the device or the network associated with the data or the user sending the data. Translation may further include adding information to the data and annotating the data. Moreover, translation may include any combination of the above types of data conversions.

In one embodiment, data received at the interface controller 1308 may include a request for data. It should be understood that the request may be dialed telephone numbers, an IP address associated with a network or device, or any other communication initiating means. When a request for data is provided by one of the user devices 1322*a*-1322*n*, the devices 1358*a*, 1358*b*, the communications networks 1320*a*, 1320*b*, or the communications networks 1356*a*, 1356*b*, the interface controller 1308 receives the request and converts the request to a digital command. The digital command is transmitted as signaling data either on the signaling line 1316 to one or more of the interfaces 1304, 1306 or on the signaling line 1318 to one or more of the interfaces 1326, 1328, and 1330 based on the devices and/or communications networks identified to receive the request. Once received at one or more of the interfaces 1304, 1306 or one or more of the interfaces 1326, 1328, and 1330, the signaling data is transmitted to the destination devices and/or communications networks either directly or via the relay device 1324. If the signaling data is transmitted to the relay device 1324, the signaling data instructs the relay device to make the required connection to the identified devices 1358*a*, 1358*b* and/or the identified communications networks 1320*a*, 1320*b*.

When a connection is made between the device 1358*a* and one or more of the user devices 1322*a*-1322*n*, between the device 1358*a* and one or more of the communications networks 1356*a*, 1356*b*, between the communications network 1320*a* and one or more of the user devices 1322*a*-1322*n*, or between the communication network 1320*a* and one or more of the communications network 1356*a*, 1356*b* in response to a request for data, the relay device 1324 detects the connection and conveys a signal to the interface controller 1308. In this illustrative embodiment, in response to receiving the signal from the relay device 1324, the interface controller 1308 enables bi-directional communication of the requested data. If one of the devices and/or communications networks that requested the data disconnects, then the disconnect is detected by the interface controller 1308. In this illustrative embodiment, the interface controller 1308 terminates the bi-directional communication by generating another signal which instructs the relay device 1324 to stop transmission and reception of the data. If, on the other hand, the relay device 1324 disconnects, then this is detected by the interface controller 1308 which, in response, terminates the bi-directional communication by stopping transmission and reception of the data.

While hardware components are shown with reference to FIG. 13 to describe the interface controller 1308, it will be clear to one of ordinary skill in the art that the interface controller 1308 may be implemented in hardware, software, firmware, or a combination thereof. In one illustrative embodiment, the interface controller 1308 is implemented in software or firmware that is stored in a memory and that is executed by a suitable instruction execution system. If implemented in hardware, as in FIG. 13, the interface controller 1308 may be implemented with any or a combination of the following technologies including, but not limited to, a discrete logic circuit having logic gates for implementing logic functions upon data signals, an ASIC having appropriate combinational logic gates, a PGA, a FPGA, other adaptive chip architectures, etc.

The power supply 1312 is configured to provide the components of the interface device 1302 with the requisite power similar to the power supply 335 discussed above in view of FIG. 3. In this sense, the power supply 1312 is connected to an external power supply 1314 from which it receives external power. The external power is converted by the power supply 1312 to a DC voltage, which is used to power the components of interface device 1302 and optionally, the relay device 1324.

Figure 14:
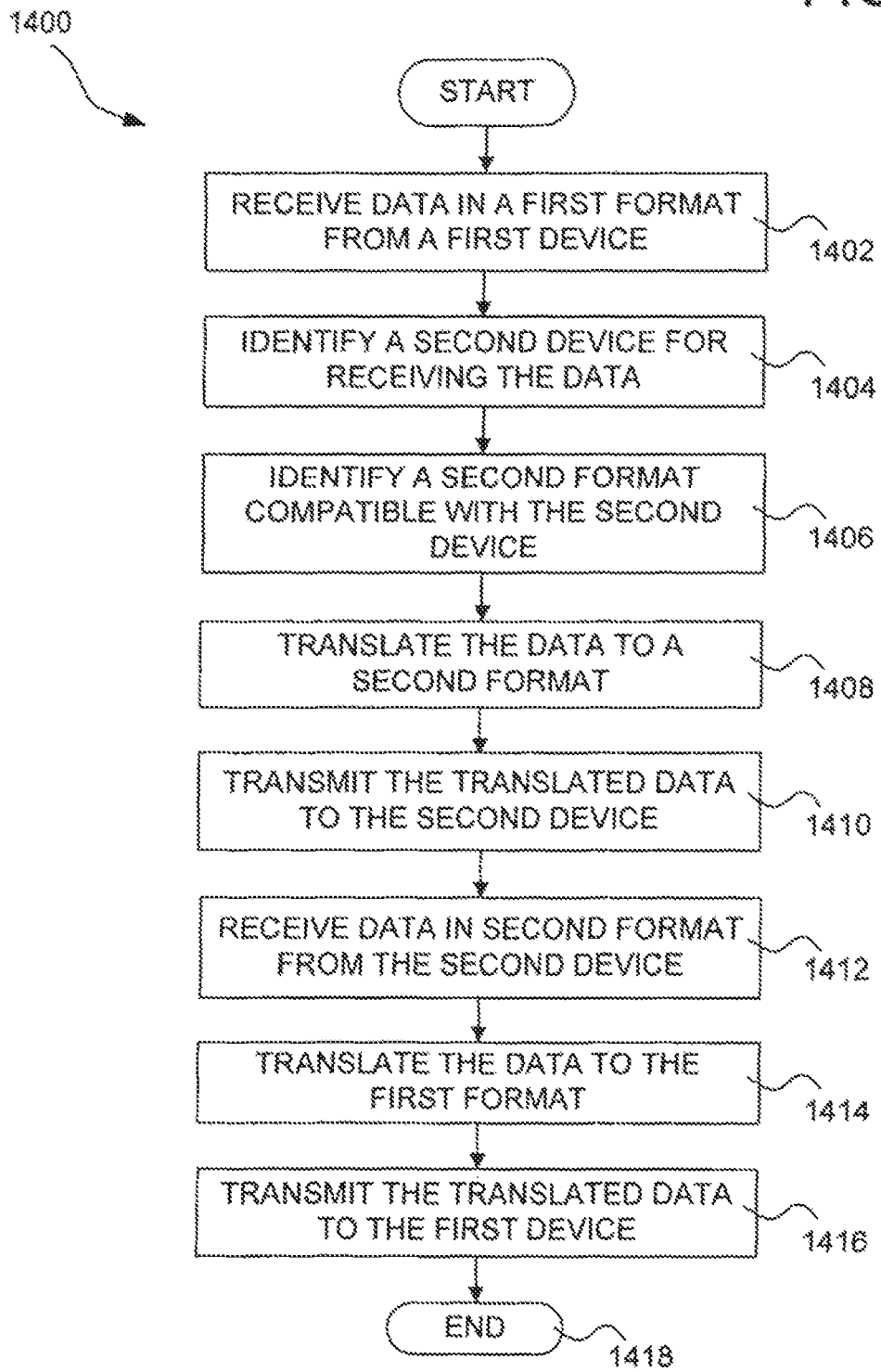
FIG. 14 is a flowchart showing an illustrative embodiment of the method and computer-readable medium associated with providing bi-directional communications between a first device and a second device.

Referring now to FIG. 14, additional details regarding the operation of the interface device 1302 for providing communications between a first device and a second device will be discussed. It should be appreciated that the logical operations of the various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing exemplary embodiments. Accordingly, the logical operations of FIG. 14 and other flow diagrams and making up the embodiments described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 1400 begins at operation 1402, where data is received in a first format from a first device, such as the device 1358a. The data is received at an interface 1304 of interface device 1302. The interface device 1302 identifies a second device, such as the device 1322a for receiving the data at operation 1404. This identification may depend upon a user profile stored within the interface device 1302. Alternatively, identifying a second device may comprise selecting a second device that is compatible with the signal type or transmission medium corresponding to the data received at interface 1304. After identifying the second device 1322a, the interface device 1302 identifies a second format compatible with the second device 1322a at operation 1406. Similarly, this process may be based on a user profile or on the characteristics of the second device 1322a. For example, the second device may be selected based on a user profile that instructs a POTS telephone to receive all media received at interface 1304. Because the POTS telephone does not have the capability to display video, the interface device 1302 may identify the second format as containing only the audio portion of the received media.

At operation 1408, the data is translated to the second format for transmittal to the second device 1322a. The data is then transmitted to the second device 1322a at operation 1410. The communications capabilities of interface device 1302 are bi-directional. At operation 1412, data is received in a second format from the second device 1322a. This data is translated to the first format at operation 1414. After transmitting the translated data to the first device 1358a at operation 1416, the routine 1400 continues to operation 1418, where it ends.

Figure 15:
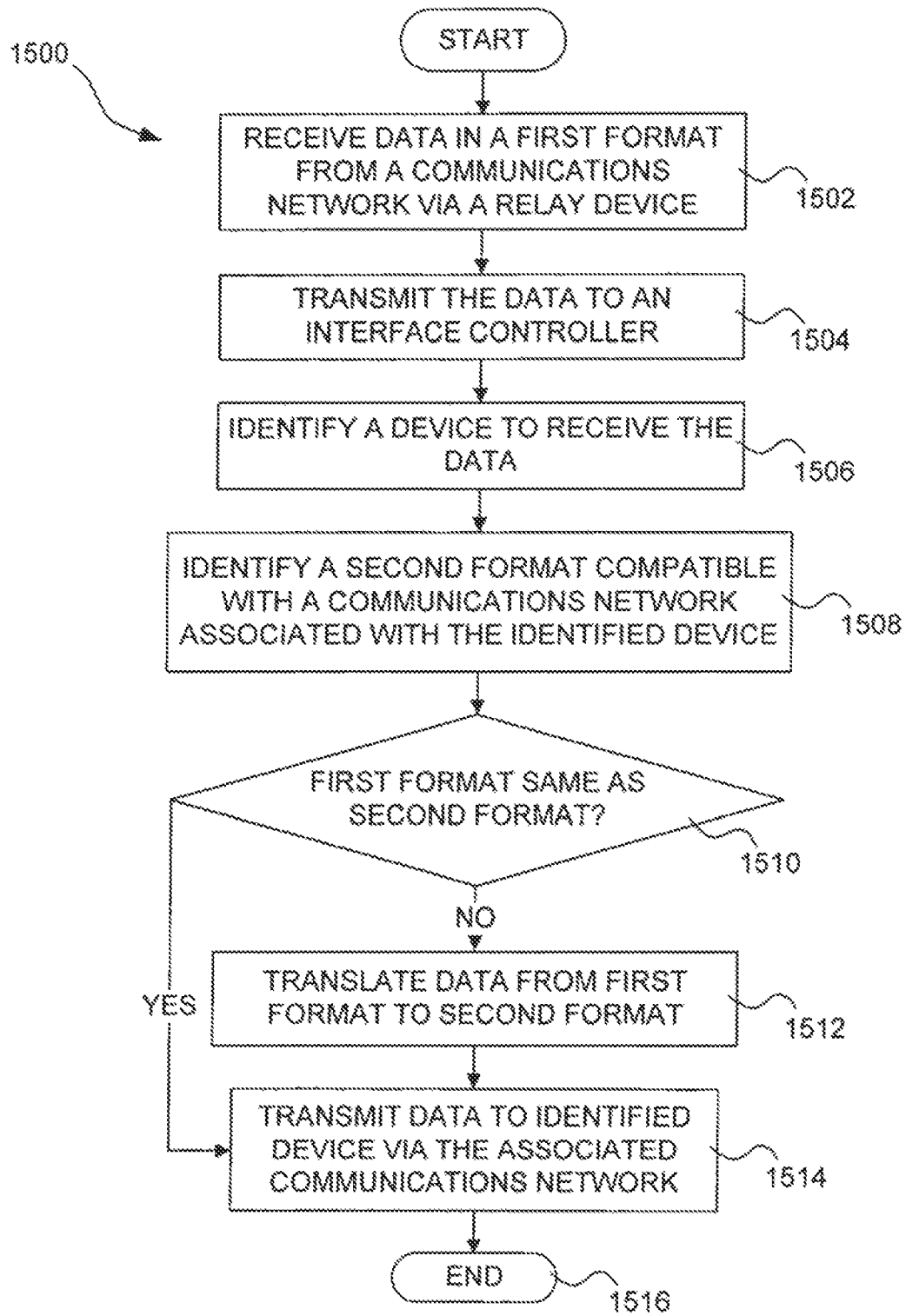
FIG. 15 is a flowchart showing an illustrative embodiment of the method and computer-readable medium associated with interfacing devices with communications networks.

Turning now to FIG. 15, an illustrative routine 1500 will be described illustrating a process for interfacing devices with communications networks. The routine 1500 begins at operation 1502, where the interface 1304 associated with the interface device 1302 receives data in a format from the communications network 1320a via the relay device 1324. As discussed above, the interface 1304 may conform to a variety of wireless or wired network standards such that the interface may receive a variety of types of data via a variety of types of signals.

Once the data is received at the interface 1304, the routine 1500 continues to operation 1504, where the data is transmitted via the signaling line 1316 to the interface controller 1308. At operation 1506, the interface controller 1308 identifies at least one of the devices 1322a-1322n to receive the data from the communications network 1320a. As discussed above in view of FIG. 13, the interface controller 1308 may identify which of the devices 1322a-1322n should receive the data based on compatibility with the communications networks associated with each of the devices, a user profile stored on the interface device 1302, or instructions from the communications network 1320a that provided the data as to which of the devices should receive the data.

After the interface controller 1308 identifies at least one of the devices 1322a-1322n to receive the data, the routine 1500 proceeds to operation 1508, where the interface controller 1308 identifies a format compatible with the communications network associated with the at least one device identified from the devices 1322a-1322n to receive the data. The routine 1500 then proceeds to operation 1510, where the interface controller 1308 determines whether the current format of the data is the same as the format compatible with the communications network associated with the at least one device identified from the devices 1322a-1322n to receive the data. If the formats are the same, then the routine 1500 proceeds to operation 1514. If the formats are not the same, then the routine 1500 proceeds to operation 1512, where the interface controller 1308 translates the data from the current format of the data to the format compatible with the communications network associated with the at least one device identified from the devices 1322a-1322n to receive the data. The routine 1500 then proceeds to operation 1514.

At operation 1514, the interface controller 1308 transmits the data, whether translated or not, to at least one of the interfaces 1326, 1328, and 1330 associated with the at least one device identified from the devices 1322a-1322n to receive the data via the signaling line 1318. As discussed above with regard to FIG. 13, the interfaces 1326, 1328, and 1330 may be conformed to a variety of wired and wireless network standards so that the interfaces can transmit a variety of types of data via a variety of types of signals. Once the data is received at the at least one interface selected from the interfaces 1326, 1328, and 1330, the routine 1500 proceeds to operation 1516, where the at least one interface transmits the data via either a wireless or wired signaling connection to the device identified from the devices 1322a-1322n to receive the data. From operation 1516, the routine 1500 continues to operation 1518, where it ends.

Figure 16:
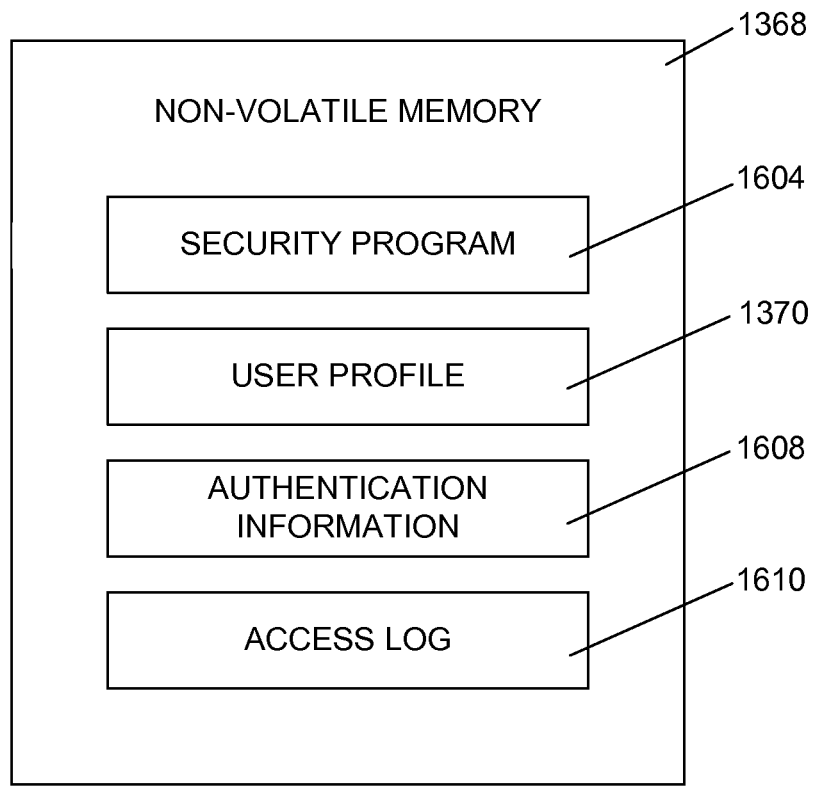
FIG. 16 is a block diagram showing the contents of a non-volatile memory according to an illustrative embodiment of the interface device.

The interface device 1302 additionally has security features for restricting access to and from the interface device or connected networks, as well as for managing the data transferred between devices or networks according to access rights associated with the data. FIG. 16 shows non-volatile memory 1368 that may be included in the interface controller 1308 according to various embodiments. As previously stated, non-volatile memory 1368 may be ROM, SRAM, or other type of non-volatile memory devices. A security program 1604 is stored within non-volatile memory 1368 and is operative to restrict access to the interface device 1302 or to the communication networks through which interface device 1302 communicates. The security program further operates to restrict device or user access to data based on device or user rights to that data. It should be appreciated that the security program 1604 may be stored within the non-volatile memory 1368, or may be located on a removable module such as a SIM card.

The security program 1604 is capable of restricting access to the interface device 1302 as well as to data being received and translated by the interface device 1302. First, restricting access to the interface device 1302 will be discussed. There are various means in which the interface device 1302 operates to restrict access to the interface device. First, the security program 1604 may comprise a firewall program. The firewall is designed to block unauthorized access while permitting outgoing communications. In a home networking environment, a user may utilize a firewall in conjunction with an interface device 1302 in order to access various data from devices or networks outside of the user's home, while preventing others outside of the home to access data located on the interface device 1302 or devices inside the user's home. The security program 1604 may additionally include unwanted email or virus protection software to prevent irrelevant or unwanted information and computer viruses from being received or executed on the interface device 1302 or other device communicatively connected to the interface device.

The security program 1604 may limit access to the interface device 1302 to only those devices or users who are registered with the interface device. A device is registered when identification information corresponding to the device is stored with the authentication information 1608 within non-volatile memory 1368. Identification information may be any data that distinguishes the device from other devices or user information. Examples include a device serial number or a unique number, name, or alphanumeric identifier assigned by a manufacturer or authorized user. When a device attempts to communicate with the interface device 1302 or other device through the interface device, the interface device receives the device identification information associated with each device participating in the communication and compares the identifier with a list of authorized device identifiers stored with the authentication information 1608. The interface device 1302 then permits or rejects the communication based on the results of the comparison. The device identification information received from each device upon initializing communications may either be received with the initial communication attempt or may be received subsequent to a request for the identification information from the interface device 1302. The authentication information 1608 is described in further detail below with respect to the user profile 1370.

It should be understood that the security program 1604 may also be operative to ensure that the relay device 1324 is authenticated for accessing the interface device 1302. Additionally, in situations where multiple relay devices are used, the security program 1604 is operative to ensure that the relay device 1324 being used to receive or transmit data is authorized to receive or transmit the specific type or amount of data that is being attempted. There may be situations in which it is desirable to limit the type or amount of data through a particular relay device 1324. The security program 1604 contemplates this scenario, allowing a user to configure the interface device 1302 for any device or data security situation.

Moreover, registration may be based on the user rather than, or in addition to, the device attempting communication. In this manner, a user would be assigned, or would choose, a user name and password that would be required for access to the interface device 1302 or to data received through the interface device. This user name and password may be stored with the authentication information 1608 within the non-volatile memory 1368. It should be understood that although the authentication information 1608 is shown in FIG. 16 as being separate from the user profile 1370, the authentication information may be part of the user profile. When configuring the user profile 1370, the user may be required, or may optionally choose, to establish a user name and password for authentication purposes. Likewise, the user may add device identification information to the user profile 1370 corresponding to the devices for which the user chooses to grant access to the interface device 1302 or associated data. It should be appreciated that the registration of devices and users may be fee-based, requiring a subscription to the interface device 1302 on a monthly or other time-period basis.

In addition to a user name and password, other authentication means may be used to establish the identity of a user attempting to access the interface device 1302 or associated data. As an example, biometrics may be used. A user may configure the interface device 1302 to utilize a fingerprint, retinal scan, facial structure recognition, voice spectral analysis, or DNA analysis to grant or deny access to the interface device 1302 or associated data. The interface device 1302 may also be configured to allow varying degrees of access and configuration rights, from full administrator access privileges to very limited access privileges. An administrator might have full rights to all features of the interface device 1302 based on the administrator authentication information provided to the interface device 1302, while a user that has only bought limited services would be given authentication information associated with the limited rights purchased.

Secure access to the interface device 1302 and data provided via the interface device may be provided to a remote device or user. A user communicates with the interface device 1302 remotely through a communication network. Just as is done for a local user, a remote user or device would be required to provide authentication information prior to being granted access to the interface device 1302 or data received via the interface device. Secure remote access may also be accomplished by utilizing a Virtual Private Network (VPN) as those skilled in the art will appreciate. Additionally, the interface device 1302 may require a Personal Identification Number (PIN) for DTMF access when communicating via the interface device 1302.

In addition to restricting access to the interface device 1302, the security program 1604 may restrict access to data through Digital Rights Management (DRM) procedures. The security program 1604 employs DRM to ensure that the user or device requesting data has rights to receive and use the data. For example, in order to receive copyrighted music, a user should have a license. Many licenses are specific to a user and allow a user to access the licensed material on a specific number of identified devices (i.e. three computers). When a user is attempting to access music on a computer via the interface device 1302, the interface device would determine if the computer is associated with a license for the music that has been granted to the user. Access to the music would be provided by the interface device 1302 if a license is associated with the computer receiving the music.

One method for restricting access to data is through encryption techniques. Digital certificates may also be used when accessing data from a communications network. The interface device 1302 may further utilize token-based authentication procedures understood to those skilled in the art to authenticate a user without sending passwords, whether encrypted or not, over a network. It should be understood by those skilled in the art that the security program 1604 may employ any security measures to ensure that only authorized users and devices have access to the interface device 1302 to receive data from devices associated with a communications network.

A further security feature of interface device 1302 includes an access log 1610, to be populated by the security program 1604. The access log 1610 includes information pertaining to each attempt to access data through the interface device 1302. The information may include any amount and type of data pertaining to each access attempt. For example, the log 1610 may include the date and time of each access attempt, the identification of the device or user attempting access, the data or device that each attempt is directed, and the success or failure status of each attempt. It should be appreciated that the access log 1610 may contain any desired information in which the security program 1604 or the interface controller 1308 is capable of tracking.

In addition to the security program 1604, non-volatile memory 1368 may store a user profile 1370. As discussed above, the user profile 1370 includes a variety of configuration and operational preferences associated with a user. For example, the user profile 1370 may include instructions that all incoming audio data be directed to an output of the interface device 1302 corresponding to a POTS telephone. In addition to user preferences, the user profile 1370 may include user and device authentication information 1608. Authentication information 1608 may be any information corresponding to identifying and authenticating a specific user or a device associated with a user for the purpose of accessing the interface device 1302 or receiving data from a source device via the interface device 1302. For example, the authentication information 1608 may include a user identification and password, encryption keys, device identifications, and data license information. The authentication information 1608 may also be stored in the relay device 1324. By doing so, the authentication information 1608 is available to the relay device 1324 at a remote location when the relay device is transported away from the interface device 1302.

The user profile 1370 may include parental control measures to allow an authorized user to grant limited access to others. A parent would have administrator privileges, allowing the parent to configure the interface device 1302 to limit data access for a particular user identification associated with their child to data received from a specific device or network, or to a specific type of data. These preferences would be configured within the user profile 1370 stored within the non-volatile memory 1368. The user profile 1370 further allows a user to filter data received at the interface device 1302 according to user preferences. For example, a user may wish to only allow data from a specific source to be translated and transmitted to a receiving device. The user may similarly wish to filter out data from a specific source. The user may also choose to extract portions of data from the data received. In this manner, the user profile 1370 becomes a set of instructions for the interface controller 1308 when controlling the translation and transmittal of data received at the interface device 1302.

The user profile 1370 may further include a watermark to be included with data that is translated and transmitted to a destination device by the interface device 1302. As used herein, a watermark may be any indicia that is added to the data to identify the source of the data. The indicia may be readily apparent to the destination device or user, or the indicia may be embedded within the data such that it does not alter the format of the data. If intended to be apparent to the destination device or user, the indicia may be visual or audible. As an example, a user may choose to add specific background music or noise to audio data sent through his or her interface device 1302. It should be appreciated that this watermark functionality may be included within the security program 1604 as a means for protecting the source identity for the data, or may be utilized by the interface controller 1308 as an entertainment feature of the interface device 1302.

Figure 17A:
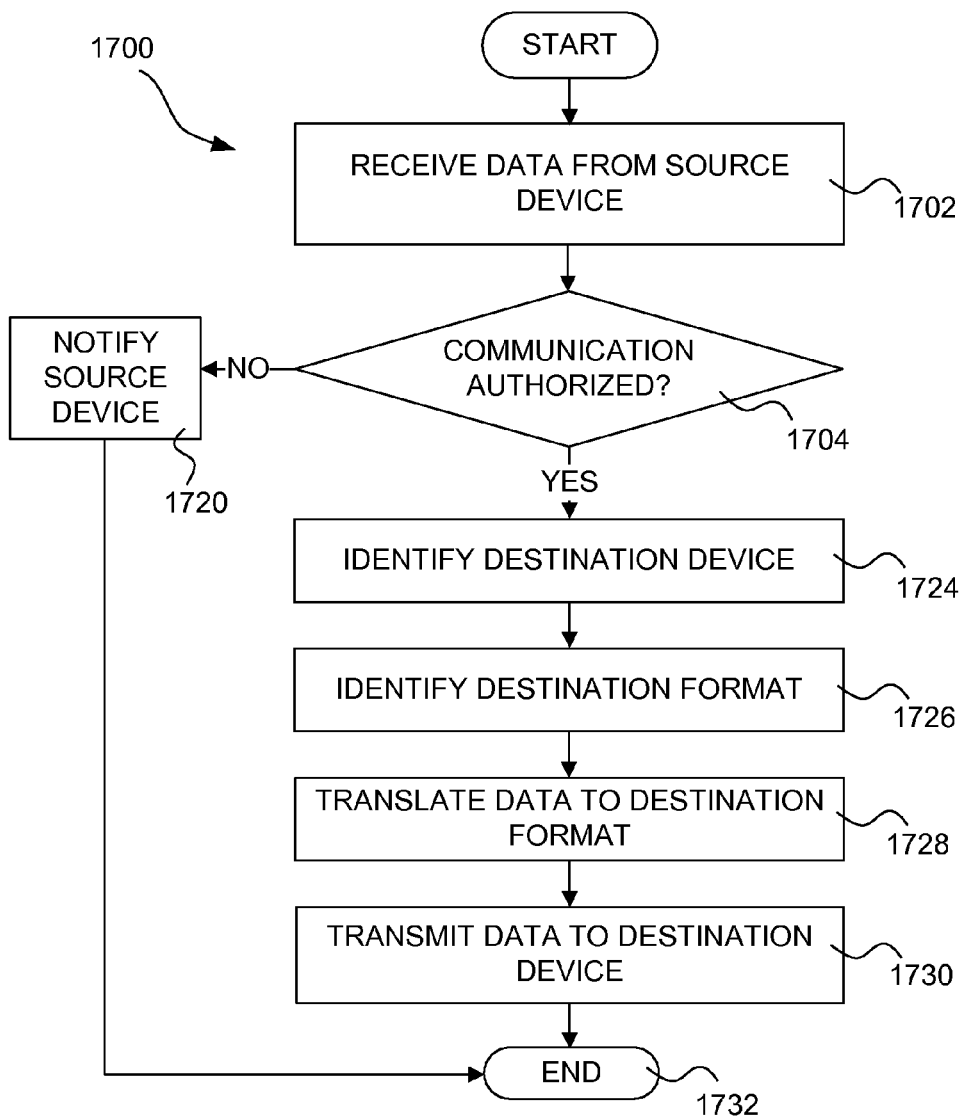
FIGS. 17A-17C are flowcharts showing illustrative embodiments of the method and computer-readable medium for restricting access to the interface device or data received via the interface device.
Figure 17B:
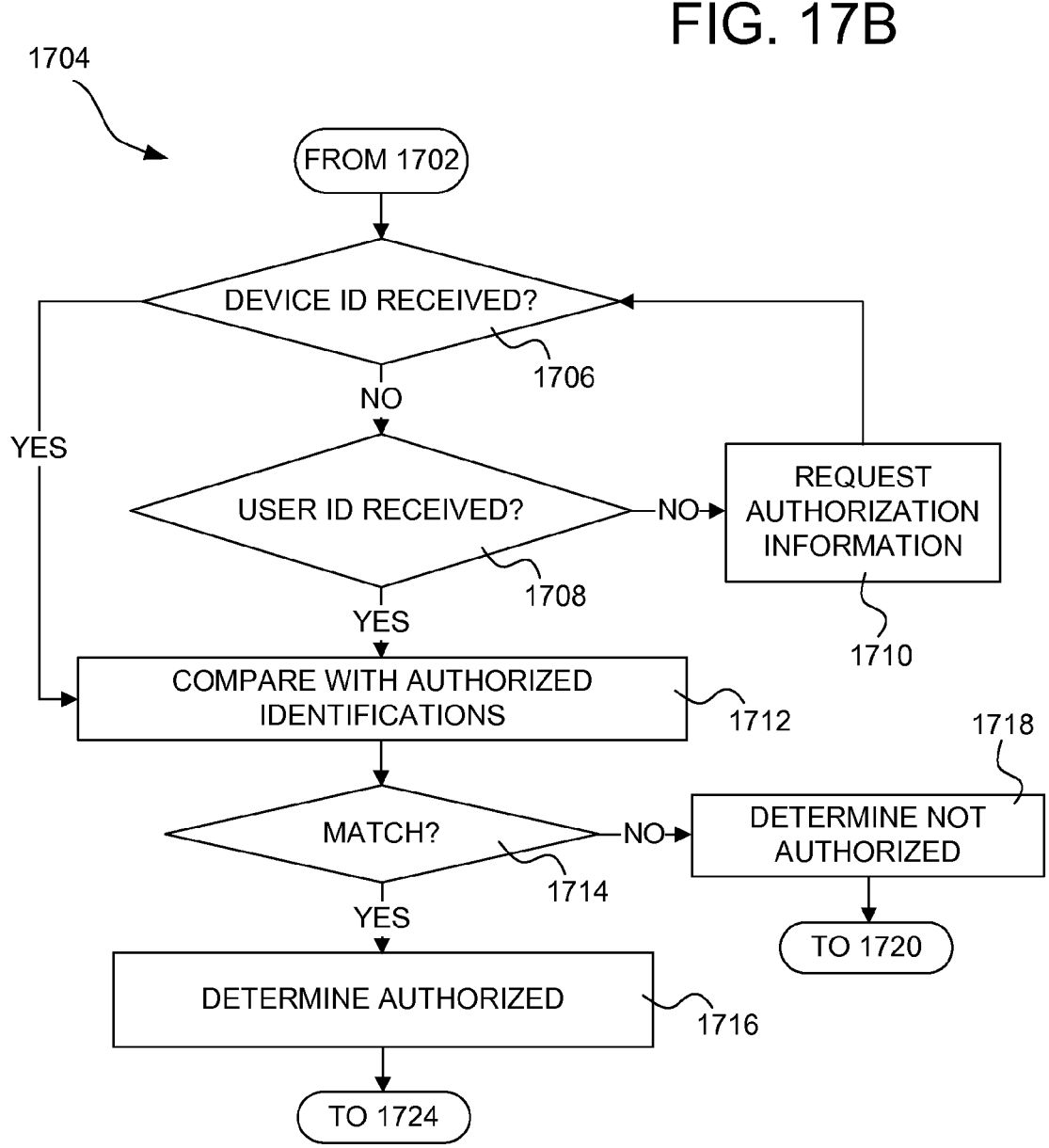

Turning now to FIG. 17A, an illustrative routine 1700 for restricting access to the interface device 1302 or data received via the interface device will be described. The routine 1700 begins at operation 1702 where data is received from a source device. At operation 1704, a determination is made as to whether the communication is authorized. FIG. 17B illustrates this determination with respect to determining whether a specific device or user is authorized to interact with the interface device 1302, without regard to the specific data being received. At operation 1706, a determination is made as to whether a device identification was received. If a device identification was received, then the identification is compared to authorized device identifications stored within the interface device 1302 at operation 1712. If a device identification was not received at operation 1706, then a determination is made as to whether a user identification was received at operation 1708. If a user identification was received, then the identification is compared to authorized user identifications stored within the interface device 1302 at operation 1712. If a user identification was not received at operation 1708, then a request for authorization information is sent at operation 1710 and the routine returns to operation 1706.

At operation 1714, a determination is made as to whether a match was found at operation 1712. If the received device identification or user identification does not match an authorized identification stored at the interface device 1302, then it is determined that the device or user is not authorized at operation 1716 and the routine continues to operation 1720 of FIG. 17A. At operation 1720, the source device is notified of the authentication failure and access is denied. The routine ends at operation 1732. However, if the received device identification or user identification matches an authorized identification stored at the interface device 1302, then it is determined that the device or user is authorized at operation 1716 and the routine continues to operation 1724 of FIG. 17A. At operation 1724, a destination device is identified for receiving the data from the source device. As described above, this identification may be made based on the type of source or receiving device, the format of the data, or the user profile.

At this operation, a further determination as to whether the destination device is authorized to receive data from the source device or interface device 1302 may be made. This determination could be necessary to avoid situations such as when the user profile 1370 specifies a destination device for receiving data, but a subscription associated with the destination device may have expired such that the destination device is not authorized to receive the data. At operation 1726, the format of the data corresponding to the destination device is identified. Similarly, this identification may be made based various factors, including but not limited to the format of the data received from the source device, the transmission medium from the interface device to the destination device, or the user profile. The data is translated to the destination format at operation 1728 and transmitted to the destination device at operation 1730. The routine ends at operation 1732.

Figure 17C:
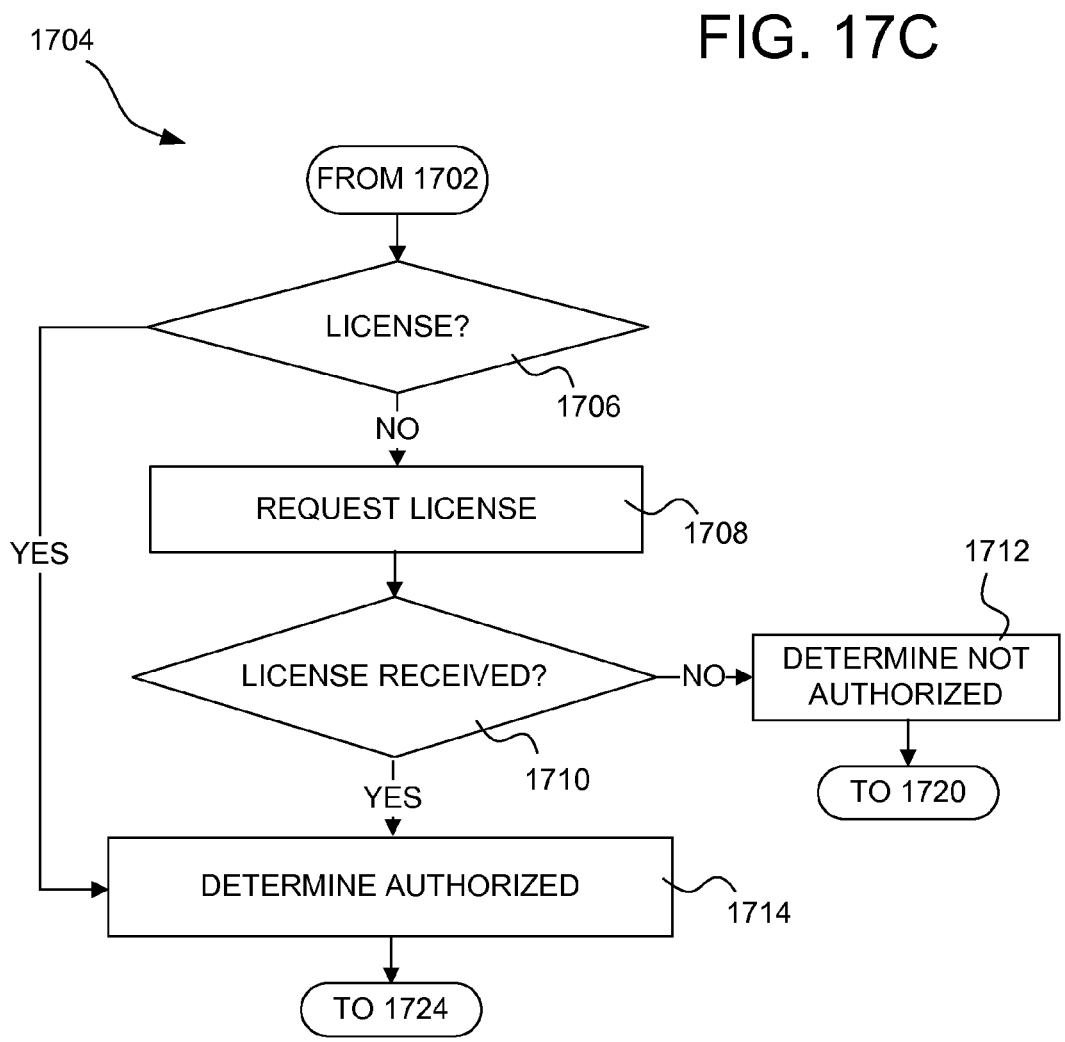

FIG. 17C returns to the communication authorization determination made at operation 1704 of FIG. 17A. FIG. 17C illustrates operation 1704 when the authorization relates to whether the destination device, interface device 1302, relay device 1324, or user has rights to the data being received. It should be understood that this authorization determination may be made not only after receiving the data, but also after requesting the data and prior to actually receiving the data at the interface device 1302. At operation 1706, a determination is made as to whether the destination device, or a user associated with the destination device, has rights to the data. These rights may be in the form of a license, the process of determining whether a requesting device is licensed for receiving information understood to those in the art. The licensing information may be stored with the authentication information 1608 in non-volatile memory 1368. Alternatively, the interface device 1302 may transmit identification information associated with the interface device, destination device, or user to the source device where the licensing determination is made. This identification information may also be stored within the relay device 1324 and transmitted to the requesting device.

If a license exists for the data, the routine proceeds to operation 1714. At operation 1714, it is determined that the destination device, or user associated with the destination device, has rights to the data and the routine continues to operation 1724 of FIG. 17A. If a license for the data does not exist, the routine proceeds to operation 1708, where a license for the data is requested. At operation 1710, a determination is made as to whether a license for the data was received as a result of the request. If not, it is determined at operation 1712 that the destination device, or user associated with the destination device, does not have rights to the data and the routine continues to operation 1720 of FIG. 17A. At operation 1720, notifications of the lack of rights to the data are transmitted and access to the data is denied. Notifications may be sent to the source device, the destination device, or the relay device 1324, displayed at the interface device 1302, or any combination thereof. The routine ends at operation 1732. However, if a determination is made at operation 1712 that a license for the data was received, then it is determined at operation 1714 that the destination device, or user associated with the destination device, has rights to the data and the routine continues to operation 1724 of FIG. The process then continues as described above.

It will be appreciated that exemplary embodiments provide methods, systems, apparatus, and computer-readable medium for interfacing devices with communications networks. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An interface device for providing communications between a first device and a second device, comprising:
    an input for receiving data in a first format from the first device;
    logic configured for
        utilizing an identity of the first device from the data to identify the second device from a plurality of user devices for receiving the data,
        identifying a second format compatible with the second device, and
        translating the data to the second format;
    an output for transmitting the translated data to the second device; and
    a security program operative to restrict access to the interface device by providing digital rights management such that the data is transmitted to the second device if the second device has rights to the data.

2. The interface device of claim 1, wherein the logic is further operative to insert a watermark into the data to identify a source of the data.

3. The interface device of claim 2, wherein the watermark is audible.

4. The interface device of claim 1, wherein the logic is further operative to provide a mechanism for generating an access log.

5. The interface device of claim 4, wherein the access log tracks data corresponding to attempts to access data via the interface device.

6. The interface device of claim 1, wherein the logic is further operative to filter the data received at the input according to user preferences.

7. A method for providing communications between a first communications device and a second communications device via an interface device, comprising:
    receiving data directed to a user at an input of the interface device in a first format from the first communications device;
    identifying a second communications device from a plurality of user devices for receiving the data according to a user profile associated with the user;
    identifying a second format compatible with the second communications device;
    translating the data to the second format;
    determining whether the second communications device is authorized to receive the data;
    transmitting the translated data from an output of the interface device to the second communications device if the second communications device is authorized to receive the data; and
    denying the second communications device access to the data if the second communications device is not authorized to receive the data.

8. The method of claim 7, wherein determining whether the second communications device is authorized to receive the data comprises determining whether the second communications device has a license for the data.

9. The method of claim 7, further comprising determining whether the second communications device is authorized to access the interface device.

10. The method of claim 9, further comprising granting access to the data or the interface device based on network connection history.

11. The method of claim 9, wherein logic for determining whether the second communications device is authorized to receive the data or to access the interface device resides on a SIM card.

12. The method of claim 7, further comprising inserting a watermark into the data to identify a source of the data.

13. An interface device for providing communications between a first device and a second device, comprising:
    an input for receiving data in a first format from the first device;
    logic configured for
        utilizing an identity of the first device from the data to identify the second device from a plurality of user devices for receiving the data,
        identifying a second format compatible with the second device, and
        translating the data to the second format;
    an output for transmitting the translated data to the second device; and
    a security program operative to restrict access to the interface device by providing digital rights management such that the data is received at the input if the interface device has rights to the data.

14. The interface device of claim 13, wherein the logic is further operative to insert a watermark into the data to identify a source of the data.

15. The interface device of claim 14, wherein the watermark is audible.

16. The interface device of claim 13, wherein the logic is further operative to provide a mechanism for generating an access log.

17. The interface device of claim 16, wherein the access log tracks data corresponding to attempts to access data via the interface device.

18. The interface device of claim 13, wherein the logic is further operative to filter the data received at the input according to user preferences.

* * * * *